May 11, 1965 K. M. ARMANTROUT ETAL 3,182,629

DRIVE UNIT FOR BOATS

Filed June 5, 1961 12 Sheets-Sheet 1

Inventors:
Kenneth M. Armantrout
and Donald W. Kelbel
By: Ray E. Snyder
Atty:

May 11, 1965 K. M. ARMANTROUT ETAL 3,182,629

DRIVE UNIT FOR BOATS

Filed June 5, 1961 12 Sheets-Sheet 2

Inventors:
Kenneth M. Armantrout
and Donald W. Kelbel
By: Ray E. Snyder Atty.

May 11, 1965 K. M. ARMANTROUT ETAL 3,182,629

DRIVE UNIT FOR BOATS

Filed June 5, 1961 12 Sheets-Sheet 3

Inventors:
Kenneth M. Armantrout
and Donald W. Kelbel
By: Ray E. Snyder Atty.

DRIVE UNIT FOR BOATS

Filed June 5, 1961 12 Sheets-Sheet 4

Inventors:
Kenneth M. Armantrout
and Donald W. Kelbel
By: Ray E. Snyder Atty.

May 11, 1965 K. M. ARMANTROUT ETAL 3,182,629

DRIVE UNIT FOR BOATS

Filed June 5, 1961 12 Sheets-Sheet 5

Inventors:
Kenneth M. Armantrout
and Donald W. Kelbel
By: Ray E. Snyder Atty.

May 11, 1965 K. M. ARMANTROUT ETAL 3,182,629

DRIVE UNIT FOR BOATS

Filed June 5, 1961 12 Sheets-Sheet 6

Inventors:
Kenneth M. Armantrout
and Donald W. Kelbel
By: Ray E. Snyder Atty.

DRIVE UNIT FOR BOATS

Filed June 5, 1961 12 Sheets-Sheet 7

Inventors:
Kenneth M. Armantrout
and Donald W. Kelbel
By: Ray E. Snyder
Atty.

DRIVE UNIT FOR BOATS

Filed June 5, 1961

Inventors:
Kenneth M. Armantrout
and Donald W. Kelbel
By: Ray E. Snyder Atty.

Inventors:
Kenneth M. Armantrout
and Donald W. Kelbel
By: Ray E. Snyder Atty.

May 11, 1965 K. M. ARMANTROUT ETAL 3,182,629

DRIVE UNIT FOR BOATS

Filed June 5, 1961 12 Sheets-Sheet 10

Inventors:
Kenneth M. Armantrout
and Donald W. Kelbel
By: Ray E. Snyder
Atty

Inventors:
Kenneth M. Armantrout
and Donald W. Kelbel
By: Ray E. Snyder Atty.

May 11, 1965 K. M. ARMANTROUT ETAL 3,182,629

DRIVE UNIT FOR BOATS

Filed June 5, 1961 12 Sheets-Sheet 12

Inventors:
Kenneth M. Armantrout
and Donald W. Kelbel
By: Ray E. Snyder Atty.

3,182,629

DRIVE UNIT FOR BOATS

Kenneth M. Armantrout and Donald W. Kelbel, Muncie, Ind., assignors to Borg-Warner Corporation, Chicago, Ill., a corporation of Illinois Filed June 5, 1961, Ser. No. 115,012
25 Claims. (Cl. 115—41)

This invention relates to a drive unit for boats and more particularly, to a stern drive unit mounted on the exterior of a boat and driven by an inboard engine.

In the propulsion of boats, a drive unit is utilized which usually comprises either a 2-cycle outboard motor and propeller unit mounted on the transom of the boat or a 4-cycle inboard engine with a propeller shaft through the bottom of the boat. Although the outboard method is advantageous to the extent that it is more portable, will kick-up upon striking an obstruction, has an adjustable thrust line, and has a direct steering effect; it has numerous disadvantages. In particular, the outboard type of drive has sizable inertia characteristics which resist kick-up, lower engine efficiency, poor weight distribution and considerable transom strain. Although the usual 4-cycle inboard engine is advantageous to the extent that it provides better efficiency than the 2-cycle outboard motor, more desirable weight distribution and no transom strain; it is nevertheless disadvantageous in that it has more limited steering characteristics, no kick-up upon striking an obstruction, a forward inclined engine mounting and a fixed thrust line.

Both the outboard and the inboard types of boat propulsion individually present unavoidable inherent advantages and disadvantages which affect efficiency and safety in a manner characterized by the specific type of drive represented thereby. It is therefore extremely important to be able to propel a boat in a manner which simultaneously provides the advantages of both the inboard and outboard types of propulsion while minimizing the disadvantages of each.

It is a primary object of this invention to provide an improved outboard marine stern drive unit adapted to be driven by an inboard engine for propelling a boat in a highly versatile controllable, efficient and safe manner.

Another object of this invention is to provide an outboard marine drive unit driven by an inboard engine, having a propeller thrust line which is angularly adjustable in a vertical plane within given limits and which permits propulsion and steering in any adjusted position.

Still another object of this invention is to provide a marine stern drive unit driven by an inboard engine, having low inertia kick-up operative upon striking an obstruction which does not interrupt the power transmitted therethrough.

Another object of this invention is to provide a marine stern drive unit driven by an inboard engine having a spring means for urging the unit from a kick-up position to a down position.

A further object of this invention is to provide a marine stern drive unit driven by an inboard engine, having a kick-up which is automatically locked against movement when the unit is shifted into reverse.

Another object of this invention is to provide a marine stern drive unit driven by an inboard engine having a depth adjustment which allows propulsion, steering and kick-up from any adjusted propeller depth.

A further object of this invention is to provide an outboard marine drive unit which can be driven by a horizontally mounted inboard engine, which does not require utilization of universal joints or horizontal offset mounting of any portion of the propeller drive train.

An additional object of this invention is to provide an outboard marine drive unit having all of the above objects and providing a gear reduction drive train having all drive shafts thereof intersecting a single axis which is angularly adjustable in a vertical plane.

A further object of this invention is to provide an outboard marine drive unit having hydraulically actuatable means for shifting the drive unit between forward, reverse and neutral.

Another object of this invention is to provide a marine stern drive unit driven by an inboard engine having a hydraulic system for selectively actuating shifting means, adjustably raising and lowering the unit, and for providing lubrication for the upper portion of the gear train.

An additional object of this invention is to provide an outboard marine drive unit having a lubricating system including a gravity fed lubricant and a cooled lubricant which can be circulated therewith for maintaining a low lubricant temperature under heavy loads to increase the effectiveness of the lubricant.

With these and other objects in view, the present invention contemplates a marine drive unit having a series of three interconnected casings wherein the first casing is secured to an inboard engine or to the stern of the boat, the second casing is pivotally connected to the first casing so as to pivot about the axis through the first casing for movement between an up and a down position, and the third casing is rotatably mounted within the second casing for changing the thrust line of the propeller to steer the boat. The second casing is urged downwardly toward a resilient stop provided on the first casing. A drive train having a neutral, forward and reverse condition, is provided within the casings and is driven by the inboard engine adjacent the first casing and drives a propeller adjacent a third casing. A hydraulic means is provided for shifting the drive train between neutral, forward and reverse, for adjustably pivoting the second and third casings upwardly about the first casing and for lubricating a portion of the drive train with cooled lubricant. A lock means is provided which ordinarily locks the second and third casings in any pivoted position when the transmission is in reverse and a latch is provided between the first and second casings to lock the second casing in the up position.

This invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 1 is a vertical section view of the marine outboard drive unit showing a hydraulically shiftable outboard marine drive unit anr the interrelationship of the body casings thereof.

FIG. 1*a* is a schematic representation showing the interrelationship of the engine, boat transom and drive unit.

Like characters of reference designate like parts in the several views.

Figure 1:
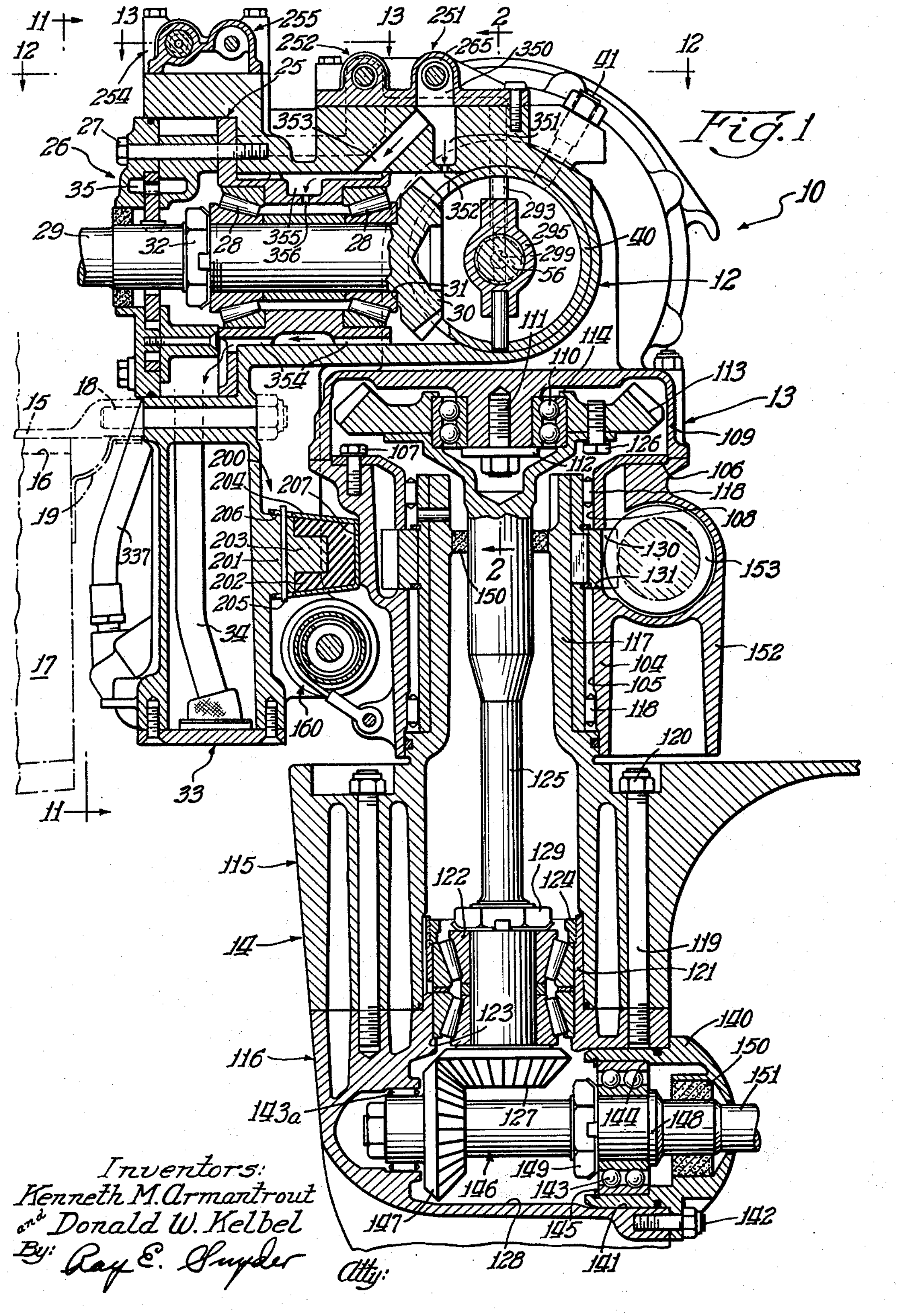

Referring to the drawings there is illustrated an exemplary embodiment of applicants' outboard marine drive unit generally designated by the numeral 10, which is driven by an inboard engine (not shown) and which is hydraulically controlled. The unit comprises three casings, namely a head or first casing 12, an intermediate or second casing 13 and propeller or third casing 14. The head casing is rigidly mounted to an engine extension 15 which extends through an opening 16 in the transom 17 of the boat. The head casing 12 is held in place on the extension by means of bolts 18, and a flexible water seal 19 is provided between the head casing 12 and the transom 17.

A bearing retainer 25 and on oil pump 26 are rigidly secured within the head casing by means of bolts 27. The bearing retainer 25 retains a set of bearings 28 in which a drive shaft 29 is rotatably mounted. A driving bevel gear 30 is formed on one end of the drive shaft 29 and the other end of the shaft 29 is drivingly connected to the engine drive shaft (not shown). The bevel gear 30 is axially retained within the bearings by virtue of a shoulder 31 on the drive bevel gear 30 and a retaining nut 32 on the shaft 29. An oil supply sump 33 is formed on the head casing 12 and provides a reservoir of oil for actuating the drive unit mechanism and for lubricating the unit. The pump 26 is illustrated as a gear type pump but may be of any suitable type adapted to pump fluid from the sump 33 through a tube 34 and discharge the fluid in a discharge passage 35.

Figure 2:
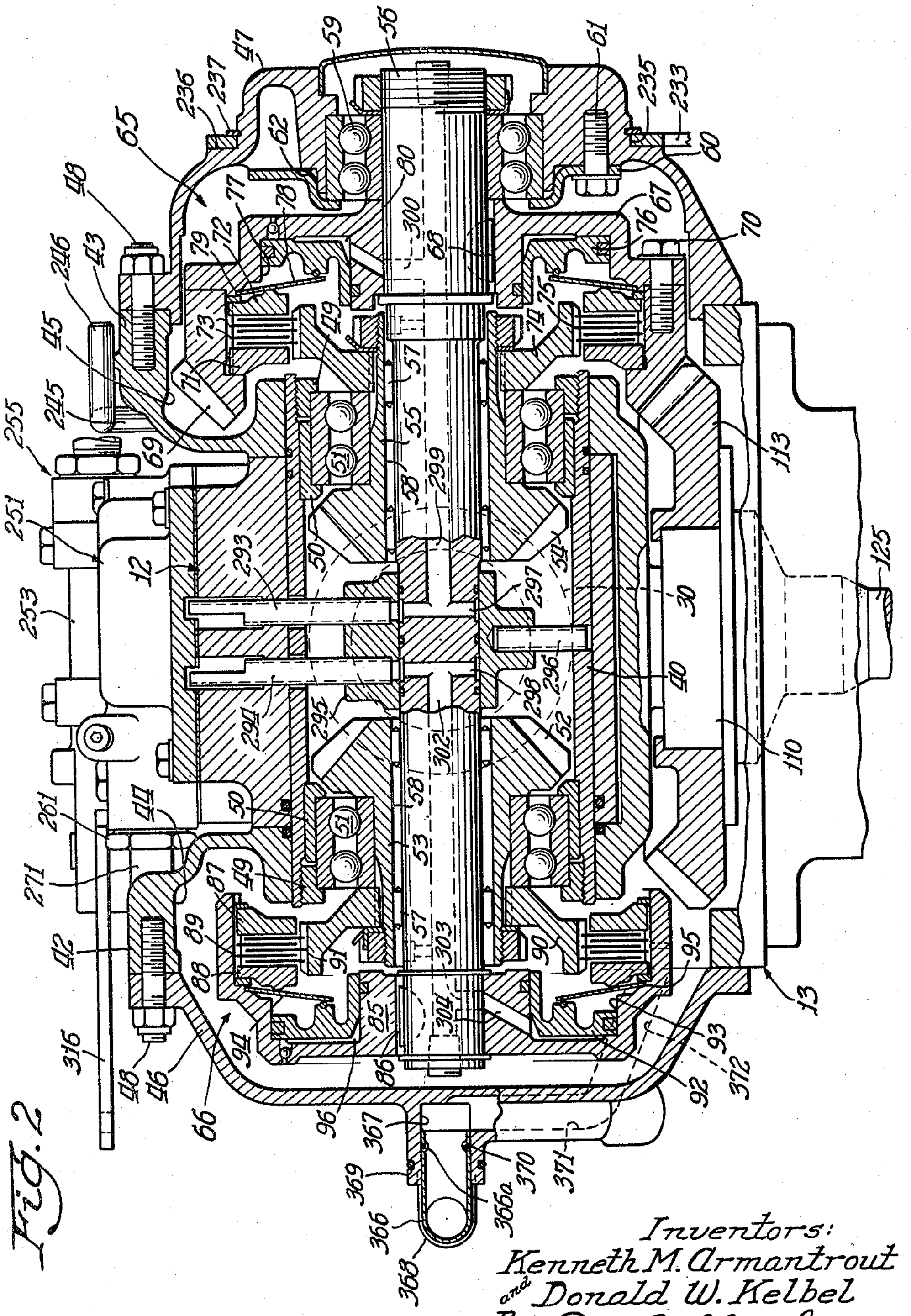
FIG. 2 is a partial section view taken along line 2—2 of FIG. 1 showing the forward and reverse elements of the outboard unit.

The intermediate casing 13 is pivotally connected to the head casing 12 by virtue of a cylindrical fulcrum tube 40 secured within the head casing 12 and extending from the left and right thereof (FIG. 2). The fulcrum tube 40 is held in place in the head casing 12 by means of a tapered key 41. The intermediate casing 13 has left and right upper yoke portions 42 and 43 respectively (FIG. 2) which pivotally support the intermediate casing 13 on the outer end surfaces of the fulcrum tube 40 and which is thereby free to pivot about the axis of the cylindrical fulcrum tube 40. The yoke portions 42 and 43 form outwardly extending cavities 44 and 45 respectively which are enclosed by a cover plate 46 and a bearing retaining cover plate 47 respectively. The cover plates are secured to the yoke portions by bolts 48.

Two cooperating bearing retainers 49 and 50 are provided within each of the ends of the fulcrum tube 40, and retain bearings 51 within the left and right ends of the fulcrum tube 40 (FIG. 2). A reverse drive bevel gear 52 is rotatably mounted in the left bearing 51 (FIG. 2) and has an integrated shaft 53 extending into the cavity 44. The reverse drive bevel gear 52 is in continuous mesh with the drive bevel gear 30. Similarly, a forward drive bevel gear 54 is provided which is in continuous mesh with the drive bevel gear 30 and which has an integrated shaft 55 extending into the cavity 45.

An idle shaft 56 is rotatably supported on bearings 57 in coaxial cylindrical openings 58 in the reverse and forward bevel gears 52 and 54. The idle shaft 56 is also rotatably supported in a bearing 59 which is held against axial movement in the cover plate bearing retainer 47 by a retainer 60 bolted to the cover plate 47 by bolts 61 and a shoulder 62 on the cover plate 47. It should be noted that the intermediate casing yoke structure and the arrangement of the drive bevel gear 30 and the reverse and forward drive bevel gears 52 and 54 facilitates pivotal movement of the intermediate casing 13 about the fulcrum tube 40 of the head casing 12 without disturbing the continuous meshing between the drive bevel gear 30 and the forward and reverse drive bevel gears 54 and 52. Thus, the intermediate and propeller casings 13 and 14 are free to pivot about the head casing 12 for adjusting the propeller depth or kicking up in the event the intermediate casing 13 or the propeller casing 14 strikes an obstruction in the water. Upon the occurrence of either event, the intermediate and propeller casings are free to kick-up or otherwise pivot counterclockwise (FIG. 1) about the idler shaft 56 and fulcrum tube 40 of the head casing 12 and thereby be adjusted or allowed to avoid the obstruction without interrupting the drive train.

Forward and reverse drive trains are provided by selectively connecting either the forward drive bevel gear 54 or the reverse drive bevel gear 52 with the idler shaft 56. For this purpose, forward and reverse clutch mechanisms are provided and are generally designated by the numerals 65 and 66 (FIG. 2). The forward drive clutch mechanism 65 includes, among other things, a hub 67 secured to the idler shaft 56 by a key 68, a bevel gear 69 rigidly secured to the hub 67 by bolts 70, respective stationary and movable pressure plates 71 and 72 splined to the inside of the gear 69, clutch plates 73 positioned between the stationary and movable pressure plates 71 and 72 and splined to the inside of the gear 69. A clutch plate hub 74 is internally splined to the forward drive bevel gear shaft 55 and has clutch plates 75 externally splined thereto which are alternately positioned between the clutch plates 73.

An annular piston 76 is slidably positioned in an annular cylinder 77 in the hub 67 and is connected to the movable pressure plate 72 by a resilient washer 78. The washer 78 is pivoted in the hub 67 at 79 and is self-biased toward the piston 76 to urge the piston 76 to the right. The piston 76 is urged to the left (FIG. 2) by fluid pumped into a chamber 80 in the cylinder 77 by a hydraulic system which will be henceforth fully described. The piston 76 can thereby be actuated by the fluid in chamber 80 to move the washer 78 to the left about the pivot point 79 and against the bias thereof so as to move the movable pressure plate 72 to the left which in turn will cause engagement of the clutch plates 73 with clutch plates 75. This engagement connects the gear 69 and the hub 67 to the clutch plate hub 74 and provides a forward drive between the forward drive bevel gear 54 and the idler shaft 56. The forward drive is broken when the fluid pressure in the chamber 80 is released and the bias of the washer 78 is allowed to return the washer and the piston 76 to the position shown (FIG. 2) and relieve the engagement between clutch plates 73 and 75.

Similarly, the reverse drive clutch apparatus 66 is provided for connecting the reverse drive bevel gear 52 with the idler shaft 56 to provide a reverse drive. The reverse drive clutch apparatus 66 includes, among other things, a hub 85 secured to the idler shaft 56 by a key 86, respective stationary and movable pressure plates 87 and 88 splined to the inside of the hub 85, clutch plates 89 positioned between the stationary and movable pressure plates 87 and 88 and internally splined to the hub 85. A clutch plate hub 90 is splined to the reverse drive bevel gear shaft 53 and has clutch plates 91 externally splined thereto which are alternately positioned between the clutch plates 89. An annular piston 92 is slidably positioned in an annular cylinder 93 in the hub 85 and is connected to the movable pressure plate 88 by a resilient washer 94. The washer 94 is pivoted in the hub 85 at 95, and is self-biased toward the piston 92. The piston 92 is urged to the right (FIG. 2) by fluid pumped into a chamber 96 in the cylinder 93 by a hydraulic system which will be henceforth fully described.

The piston 92 can thereby be actuated by the fluid in the chamber 96 to move the washer 94 to the right (FIG. 2) about the pivot point 95 against the bias of the washer 94 so as to move the movable pressure plate 88 to the right which in turn will cause engagement of the clutch plates 89 with clutch plates 91. This engagement connects the hub 85 to the clutch plate hub 90 and provides a reverse drive between the reverse drive bevel gear 52 and the idler shaft 56. The reverse drive is broken when the fluid pressure in the chamber 96 is released and the bias of the resilient washer 94 is allowed to return the piston 92 to the position illustrated (FIG. 2) and thereby relieve the contact between the clutch plates 89 and 91. It should be noted that by actuating either the reverse or forward drive mechanism, a forward or reverse drive will be completed between the forward drive bevel gear 54 or the reverse drive bevel gear 52 and the idler shaft 56 which is in turn adapted to drive the bevel gear 69. Thus, the bevel gear 69 will be selectively driven in forward or reverse. Also, it should be noted that if neither of the clutch mechanisms 65 or 66 is actuated, then neither the forward or the reverse drive bevel gears 54 or 52 will be connected to the idler shaft 56 and bevel gear 69 and as a consequence, there will be a neutral condition created in the drive unit.

The intermediate casing 13 has a cylindrical portion 104 extending downwardly (FIG. 1) which provides a lower inner cylindrical surface 105. A retainer 106 is secured to the inside of the intermediate casing 13 by bolts 107 and provides an upper inner cylindrical surface 108 which is coaxial with the lower inner cylindrical surface 105. A bearing support 109 is provided within the intermediate casing 13 for supporting a bearing 110. The bearing 110 is retained on the support 109 by bolt 111 and washer 112. A bevel gear 113 is supported on the bearing 110 in meshing engagement with the bevel gear 69 of the head casing 12 and is retained against axial movement away from the bevel gear 69 by a flange 114.

The propeller casing 14 comprises upper and lower housings 115 and 116 respectively. The upper propeller housing 115 has an upper cylindrical portion 117 which is concentrically rotatably mounted on bearings 118 within the upper and lower surfaces 108 and 105 of the intermediate casing 13. The lower propeller housing 116 is secured to the upper propeller housing 115 by bolts 119 and nuts 120. A bearing sleeve 121 is formed on the lower propeller housing 116. A bearing 122 is held in the sleeve 121 by a shoulder 123 and a bearing retainer ring 124.

An intermediate shaft 125 is rotatably supported by the bearings 113 and 122 and is secured to the bevel gear 113 by bolts 126 so as to rotate with the bevel gear 113. The intermediate shaft 125 has a bevel gear 127 on the lower extremity thereof and which is positioned in a cavity 128 of the lower propeller housing 14. The intermediate shaft 125 is held against axial movement by the bearing 110, the washer 112 and the bevel gear 113. Thus, the power transmitted to the bevel gear 113 by the bevel gear 69 is likewise present in the lower bevel gear 127. The propeller casing 14 is held against axial movement within the intermediate casing 13 by a spur gear 130 which is secured to the upper cylindrical portion 117 and which enters an annular opening 131 formed by the cylindrical portion 104 of the intermediate casing 13 and the retainer 106.

The lower propeller housing 116 of the propeller casing 14 is provided with a bearing retainer cap 140. The cap 140 is retained in an opening 141 of the lower propeller housing cavity 128 by means of bolts 142. A bearing 143 is held in the bearing retainer cap by a shoulder 144 and a retaining ring 145. A propeller shaft 146 is rotatably supported on the bearing 143 in the cap 140 and on bearings 143*a* in the lower propeller housing 116 (FIG. 1). The shaft 146 is provided with a bevel gear 147 in meshing engagement with the bevel gear 127 of the intermediate shaft 125. The shaft 146 is held against axial movement within the lower propeller housing 116 by a flange 148 formed on the shaft 146 and a retaining nut 149 threaded on the shaft 146 adjacent the bearing 143. Lubricant seals 150 are provided in the upper propeller housing 115 and in the cap 140 for sealing lubricant within the propeller casing 14. The propeller shaft 146 is adapted to drive a propeller (not shown) portion 151 which extends through the cap 140.

A steering mechanism is provided for the drive unit 10 and includes a mechanism for rotating the propeller casing 14 within the intermediate casing 13 in response to a steering wheel or similar device (not shown). A worm gear housing 152 is provided (FIG. 1) on the intermediate casing 13 for rotatably supporting a worm gear 153. The worm gear 153 is in mesh with the spur gear 130 and can be connected to the steering wheel or similar device by any suitable means such as a flexible cable (not shown) so that rotation of the steering wheel will cause a corresponding rotation of the worm gear 153 regardless of the position of the intermediate casing 13 relative to the head casing 12. In this manner, the rotation of the worm gear 153 by the steering wheel will cause a rotation of the propeller casing 14 within the intermediate casing 13. This will likewise change the thrust line of the propeller shaft 146 and as a consequence determine the direction of thrust applied by the propeller for the purpose of steering the boat.

Although applicants have illustrated a one-to-one gear ratio drive train through the unit 10, the unit is not necessarily so limited. The bevel gear 30, or 69, may be reduced in size to provide a gear reduction in the drive train without resorting to adjacent offset drive shafts. In the past, it has been necessary to resort to such an offset in the drive shafts when a gear reduction was to be had. Applicants' drive unit 10 allows the unit to be mounted with the drive shaft 29 thereof in a central or other vertical plane of the boat with the intermediate shaft 125 operating in the same plane without any lateral or horizontal offset.

Figure 3:
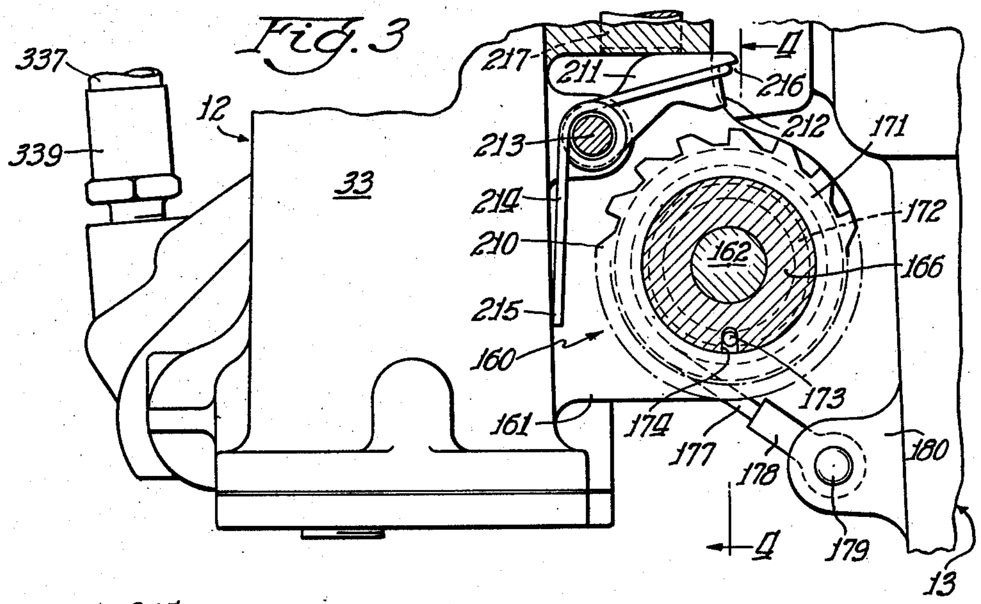
FIG. 3 is a partially sectioned side view showing the interrelationship of the reverse lock mechanism and the first and second casings.
Figure 15:
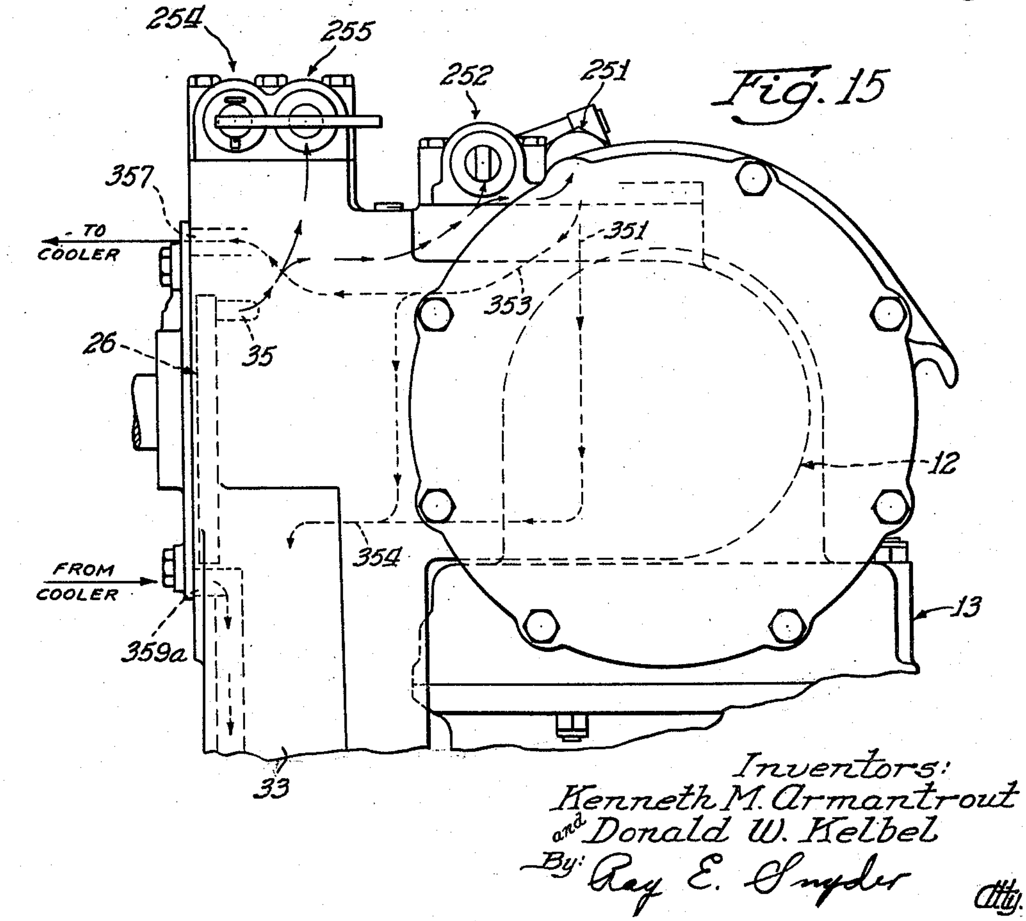
FIG. 15 is a side view of the marine drive unit showing the path of the fluid used for shifting the transmission, for lifting the second and third casings, and for lubricating the drive train.
Figure 5:
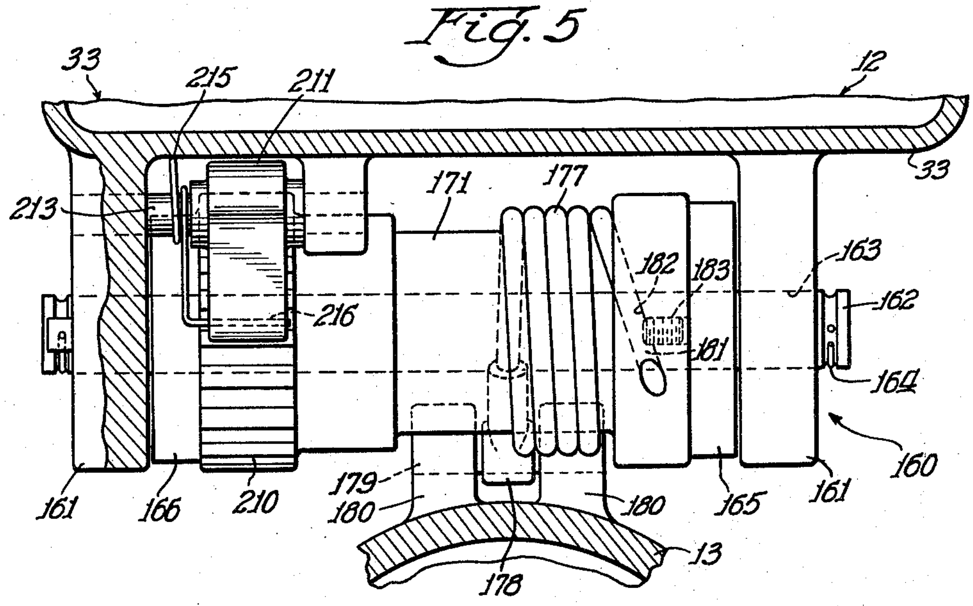
FIG. 5 is a partial sectional view taken along line 5—5 of FIG. 4 showing the cable which interconnects the spring means of the first casing and the forward portion of the second casing.
Figure 4:
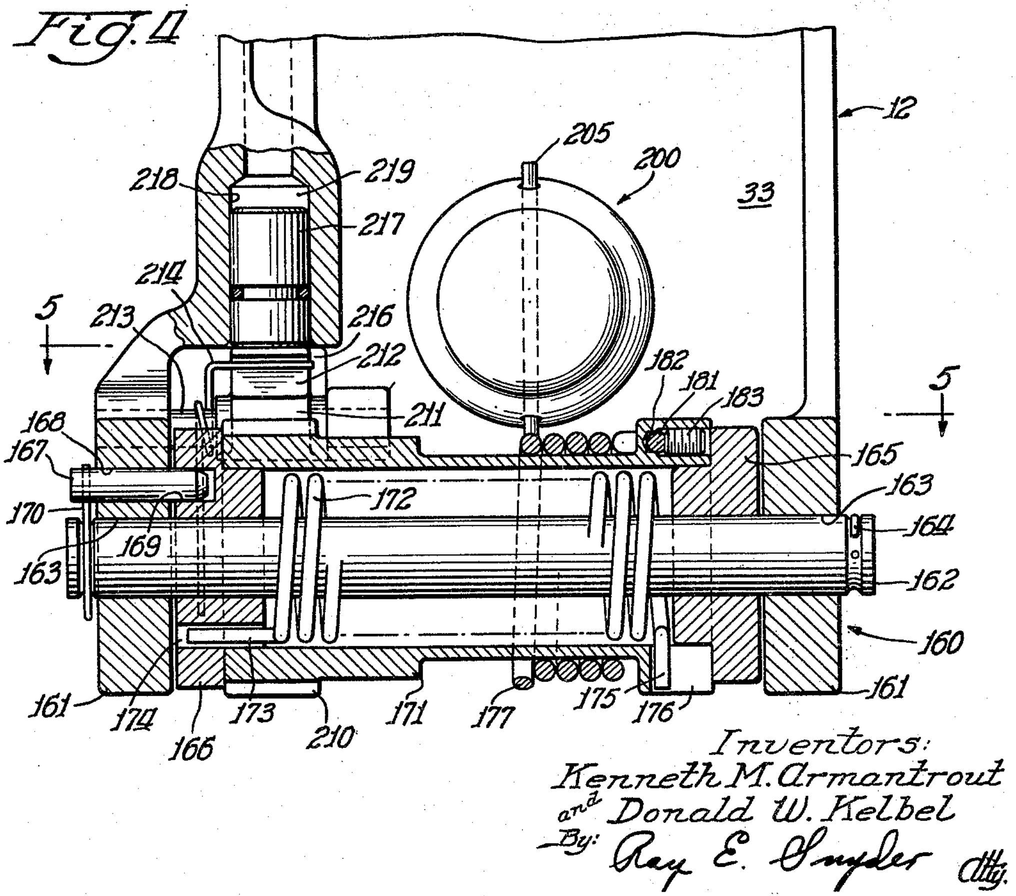
FIG. 4 is a partial sectional view taken along line 4—4 of FIG. 3 showing the spring mechanism for urging the second casing to the down position and the relation thereof to the reverse lock mechanism.

An intermediate casing return mechanism, generally designated by the numeral 160 (FIGS. 1, 3, 4, and 5), is provided for the drive unit 10 to pivotally urge the intermediate and propeller casings 13 and 14 clockwise about the head casing 12 (FIG. 3). The return mechanism 160 includes a pair of brackets 161 formed on the fluid sump 33 of the head casing 12. A shaft 162 is positioned in aligned holes 163 of the brackets 161 and is secured against axial movement to the left (FIG. 4) by a spring retainer 164. A rotatable hub 165 is rotatably mounted on the shaft 162 and a stationary hub 166 is positioned on the shaft 162 adjacent the left bracket 161 (FIGS. 4 and 5). The stationary hub 166 is held against rotation on the shaft 162 by a pin 167 which is inserted in openings 168 and 169 in the left bracket 161 and the stationary hub 166 respectively (FIG. 4). The pin 167 is held in position by a spring retainer 170 which also engages the left end of the shaft 162 and holds the shaft 162 against axial movement to the right (FIG. 4).

A hollow cylindrical reel 171 is rotatably mounted on the stationary hub 166 and the rotatable hub 165, and a coil spring 172 is positioned around the shaft 162 within the cylindrical reel 171. One end 173 of the spring 172 extends axially into an opening 174 in the stationary hub 166 and is thereby held against rotation. The other end 175 of the coil spring 172 extends radially into a slot 176 in the reel 171 and is thereby constrained to rotate with the cylindrical reel 171. A cable 177 is provided for interconnecting the intermediate casing 13 and the reel 171. One end of the cable 177 is adapted with a coupling 178 (FIGS. 3 and 5) which is pivotally mounted on a shaft 179 secured in brackets 180 which extend from the intermediate casing 13. The cable 177 is rolled on the reel 171 and the other end 181 of the cable 177 is positioned in a passage 182 of the reel 171 and is secured to the reel within this passage by screw 183.

When the intermediate casing 13 is moved counterclockwise (FIGS. 1 and 3) about the head casing 12 to any given position, the cable 177 will be unrolled from the reel 171 and the reel will be forced to rotate counterclockwise. Counterclockwise rotation of the reel 171 will cause a similar rotation of the end 175 of the spring 172. Inasmuch as the other end 173 of the spring 172 is held stationary, the spring will resist the counterclockwise rotation of the reel 171 so as to urge the reel in a clockwise direction. Thus, when the intermediate casing is pivoted counterclockwise about the head casing the spring will be biased so as to resist the counterclockwise move of the intermediate casing through the connection provided by the cable 177 and thereby urge the clockwise return of the intermediate casing 13 when the counterclockwise force on the intermediate casing 13 is released.

A second embodiment of applicant's invention provides a return mechanism 160*a* for the intermediate casing (FIGS. 6 and 7) which includes a pre-coiled flat spiral spring 190 and a hub 191. The hub 191 is rotatably mounted on the shaft 162 between the brackets 161. The pre-coiled flat spiral spring 190 is positioned on the hub 191 with an inner end 192 thereof adapted with a clamp 193 which is secured to a shaft 194 which in turn is longitudinally positioned in openings 195 in the hub 191. The other end 196 of the pre-coiled flat spring 190 is adapted with a clamp 197 which is secured to the shaft 179 which in turn is positioned in the brackets 180 of the intermediate casing 13.

In the event that the intermediate casing is pivoted counterclockwise (FIGS. 1 and 6) about the head casing 12, the flat pre-coiled spring 190 will be uncoiled to the extent of the counterclockwise pivotal movement of the intermediate casing 13. Inasmuch as the flat coiled spring 190 is pre-coiled, it will resist the uncoiling and thereby will urge the intermediate casing 13 clockwise about the head casing 12 and return the intermediate casing 13 clockwise to its lowermost position when the clockwise pivotal force on the intermediate or propeller casing is released.

Figure 6A:
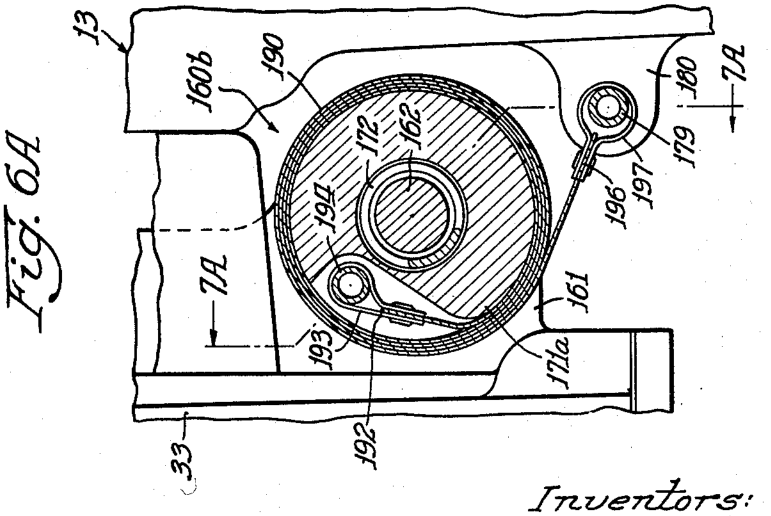
FIG. 6A is a partial sectional view taken along line 6A—6A of FIG. 7A showing the flat pre-coiled spring and the coil spring utilized together for urging the second casing toward the down position.

A third embodiment of applicants' invention (FIGS. 6A and 7A) provides a return mechanism 160*b* for the intermediate and propeller casings 13 and 14 and generally includes the coil spring 172, the pre-coiled flat spiral spring 190, the movable hub 165, the stationary hub 166, the pin 167, the shaft 162 and the retainers 164 and 170. A modified reel 171*a* is a rotatably mounted on the stationary hub 166, and is secured on the movable hub 165. It should be noted that the end 175 of the coil spring 172 is secured in a slot 176*a* of the modified reel 171*a* and the other end 173 of the coil spring 172 is secured in an opening 174*a* of the stationary hub 166. The coil spring 172 will thus resist any force causing a counterclockwise rotation (FIG. 1) of the intermediate and propeller casings 13 and 14 in the same manner as did the first embodiment 160 (FIGS. 4 and 5) of the return mechanism.

The flat pre-coiled spring 190 is positioned on the modified reel 171*a* with the inner end 192 thereof adapted with the clamp 193 which is secured to the shaft 194 which in turn is positioned in the openings 195*a* of the modified reel 171*a*. The other end 196 of the precoiled flat spring 190 is adapted with the claim 197 which is secured to the shaft 179 which in turn is positioned in the brackets 180 of the intermediate casing 13. The precoiled flat spiral spring 19*a* will resist any force causing a counterclockwise rotation (FIG. 1) of the intermediate and propeller casings 13 and 14 in the same manner as did the second embodiment 160*a* (FIGS. 6 and 7) of the return mechanism.

In the event that a force is applied to the intermediate or propeller casings 13 or 14 so as to pivot the casings counterclockwise (FIGS. 1 and 6) about the head casing 12, the flat pre-coiled spring 190 (FIG. 7A) will be uncoiled to the extent of the clockwise pivotal movement of the intermediate casing and the spring end 175 of the coiled spring 172 will be likewise rotated about the shaft 162. In this event, both the flat-pre-coiled spring 190 and the coiled spring 172 will resist the counterclockwise pivotal rotation of the intermediate and propeller casings 13 and 14 and thereby urge the intermediate and propeller casings clockwise about the head casing 12, tending to return the intermediate and propeller casings clockwise to the lowermost position as the clockwise pivotal force on the intermediate casing is released.

Figures 6, 7:
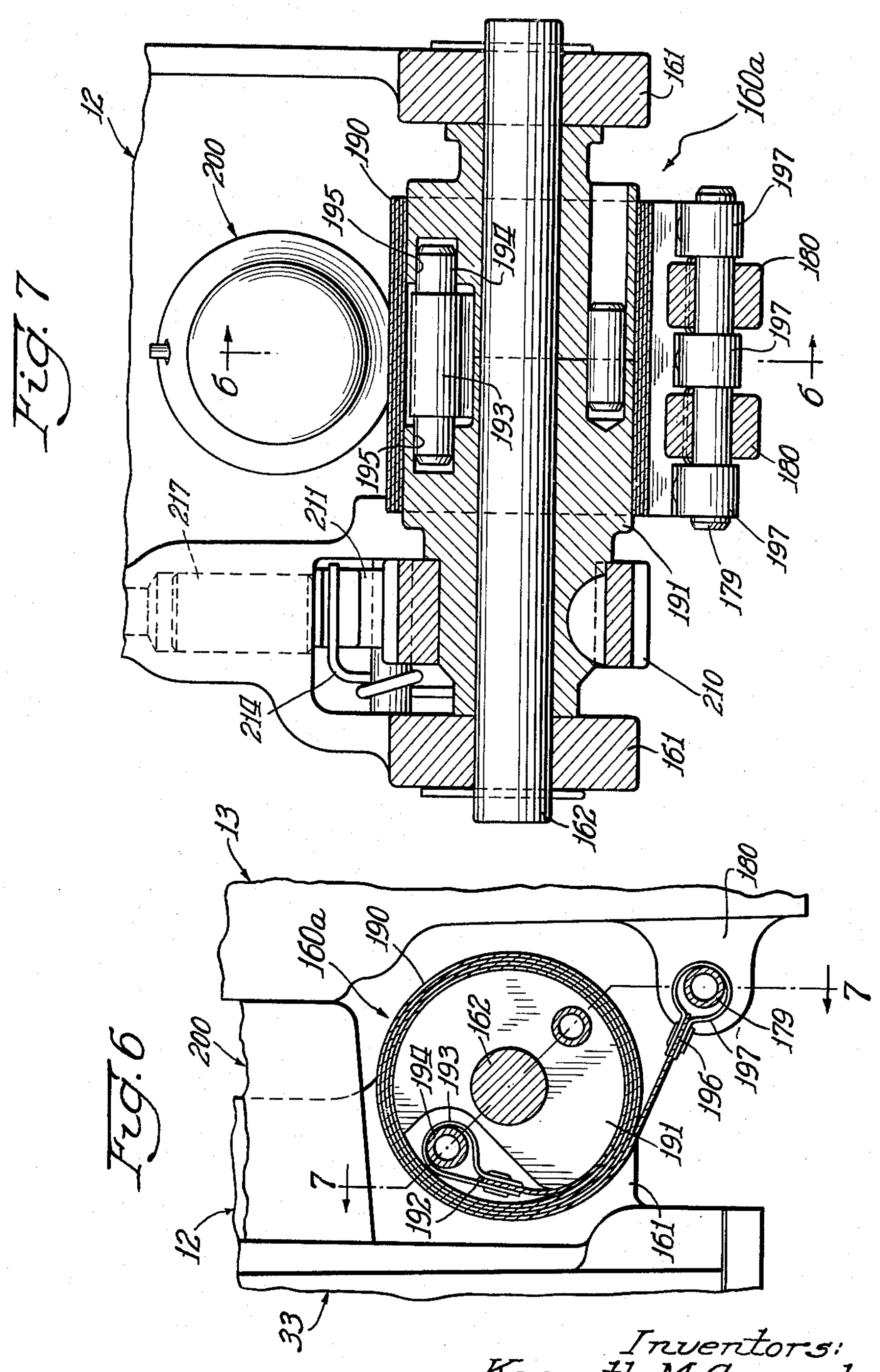
FIG. 6 is a partial sectional view taken along line 6—6 of FIG. 7 showing the flat pre-coiled spring utilized by itself for urging the second casing toward the down position.
FIG. 7 is a partial sectional view taken along line 7—7 of FIG. 6 showing the flat pre-coiled spring utilized by itself for urging the second casing toward the down position.
Figure 7A:
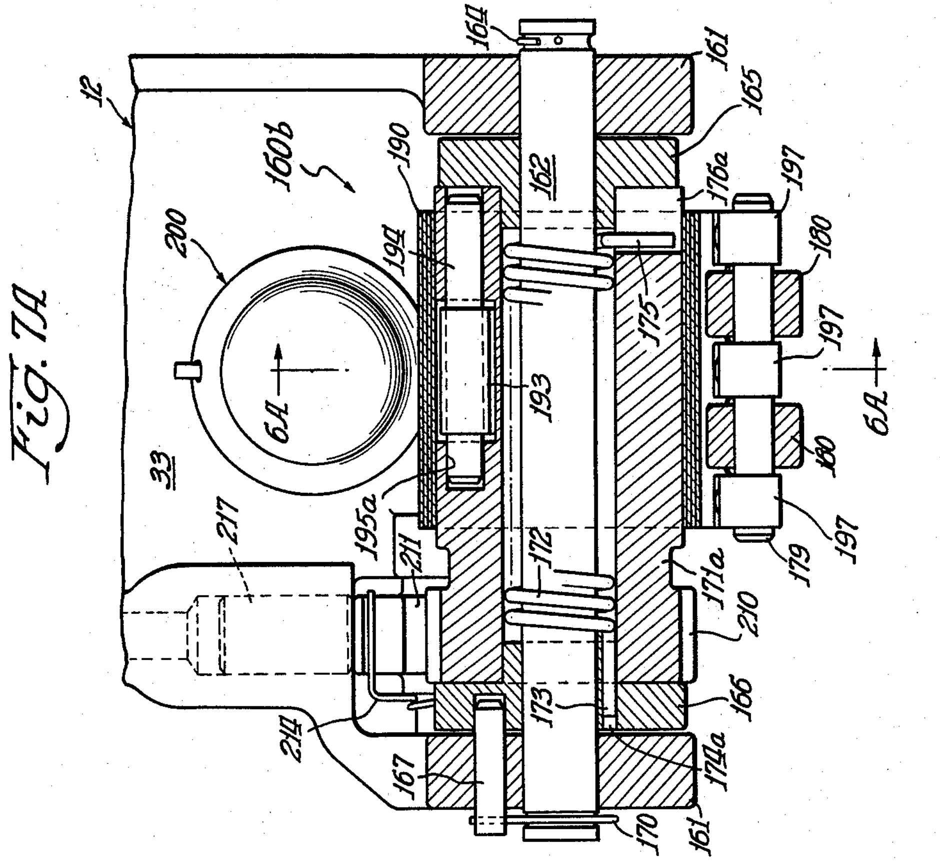
FIG. 7A is a partial sectional view taken along line 7A—7A of FIG. 6A showing the flat pre-coiled spring and the coil spring utilized together for urging the second casing toward the down position.

A stop, generally designated by the numeral 200 (FIGS. 1, 3, and 6) is provided on the sump 33 of the head casing 12 for engaging the intermediate casing 13 when the intermediate casing is rotated clockwise to its lowermost position (FIGS. 1, 3, and 6). The stop 200 includes a base 201 formed on the sump 33 and has a frusto-conical resilient cushion 202 made of rubber or other similar resilient material. The cushion 202 is adapted to be positioned on a reduced portion 203 of the base 201 and is retained on the base 201 by a frusto-conical cover shield 204. The cover 204 is movably secured to the base 201 by means of a pin 205 which passes through the base 201 and extends into slots 206 on the top and bottom of the cap 204. The cover 204 is adapted to engage a flat surface 207 on the intermediate casing 13 so that when the intermediate casing is pivoted counterclockwise (FIG. 1) into engagement with the cap 204, the cushion 202 will absorb the impact of the intermediate casing 13 and will provide a stop therefor.

A positive reverse lock mechanism is provided (FIGS. 3, 4, and 5) which includes a rachet 210 secured to the cylindrical reel 171 and a pawl 211 adapted with a tooth 212 for engaging the rachet 210. The ratchet 210 is pivotally mounted on a pin 213 secured to the head casing sump 33. A spring 214 is positioned on the pin 213 and engages the sump 33 and 215 and pawl 211 at 216 and is adapted to urge the pawl 211 in a counterclockwise direction (FIG. 3) into engagement with a piston 217 (FIGS. 3 and 4). The piston 217 is slidably mounted in a cylinder 218 in the sump 33 and is actuated by fluid which is supplied to a chamber 219 of the cylinder 218. The fluid is supplied to the chamber 219 by a hydraulic system which will be henceforth fully described, and is supplied thereby only when the drive unit is in reverse.

The piston 217 is thereby urged downwardly (FIGS. 3 and 4) by the fluid in the chamber 219 so as to cause the pawl 211 to engage the ratchet 210 and thereby restrain the reel 11 against counterclockwise rotation (FIG. 3) and prevent counterclockwise pivotal movement of the intermediate and propeller casings 13 and 14 about the head casing 12. The reverse lock prevents the propeller thrust from rotating the intermediate and propeller casings 13 and 14 in a counterclockwise direction which would raise the propeller out of the water and circumvent the effect of the reverse drive thrust provided by the propeller.

A lift or adjusting mechanism (FIGS. 8–10) is provided for rotating the intermediate and propeller casings 13 and 14 about the head casing 12. The lift mechanism includes a hydraulic cylinder 225 which is pivotally mounted on a shaft 226 which is secured to the head casing sump 33. The hydraulic cylinder 225 is retained on the shaft 226 by a pin 227. Inner and outer telescoping pistons 228 and 229 respectively are slidably mounted within the cylinder 225.

The inner piston 228 has a shoulder 230 on the upper side thereof and has a connecting rod 231 which extends slidably through an opening 232 in the outer piston 229. The connecting rod 231 is pivotally connected to a bracket 233 by a pin 234. The bracket 233 is rotatably mounted on a surface 235 (FIGS. 2 and 8), the cover plate bearing retainer 47, and is held against axial movement thereon by a shoulder 236 and a retainer ring 237. The bracket 233 is adapted at **239*a* (FIGS. 8 and 9) to engage a lug 239 which projects axially from the cover plate 47**.

The outer piston 229 is provided with a shoulder 240 and the cylinder 225 is provided with a stop 241. The stop 241 is positioned in the path of the shoulder 240 so as to limit the movement of the piston 229 within the cylinder 225. The outer piston 229 is also provided with an inner end surface 242 and an exhaust port 243. The exhaust port extends from the inner end surface 242 to the shoulder 240 and is in registry with an exhaust port 244 in the cylinder 225. The exhaust ports 243 and 244 thereby provide a vent passage for relieving any back pressure between the inner surface of the outer piston 229 and the piston 228 which would otherwise prevent relative motion therebetween.

In operation, the lift mechanism is actuated by fluid provided by the hydraulic system (FIG. 10) which will be henceforth fully described. The fluid is supplied to a chamber 238 in the hydraulic cylinder 225 and urges the piston 228 to the left and upward toward the bracket 233 (FIG. 8) and will thereby cause clockwise rotation of the bracket 233 (FIG. 8) and likewise rotate the intermediate and propeller casings 13 and 14, until a shoulder 230 on the inner piston 228 engages the inner surface 242 of the outer piston 229. Thereafter, continued application of fluid into cylinder 225 will cause the inner and outer pistons 228 and 229 to move together to the left and upward until the shoulder 240 engages the stop 241. This movement will result in a corresponding rotation of the bracket 233 to the position indicated by the dotted line (FIG. 8).

Inasmuch as the bracket 233 is in engagement with the lug 239 of the intermediate casing cover plate 47, the intermediate and propeller casings 13 and 14 will be pivoted clockwise about the head casing 12 to a predetermined position determined by the amount of fluid supplied to the cylinder. The intermediate and propeller casings are rotated counterclockwise (FIG. 8) by releasing fluid pressure in the cylinder 225 whereupon the weight of the intermediate and propeller casings 13 and 14 combined with the bias exerted by the spring 172 or 190 of the spring return mechanism, will urge the intermediate and propeller casings counterclockwise (FIG. 8) to a lower or the lowest position depending on the amount of fluid released from the cylinder 225.

Figures 1A, 8, 9:
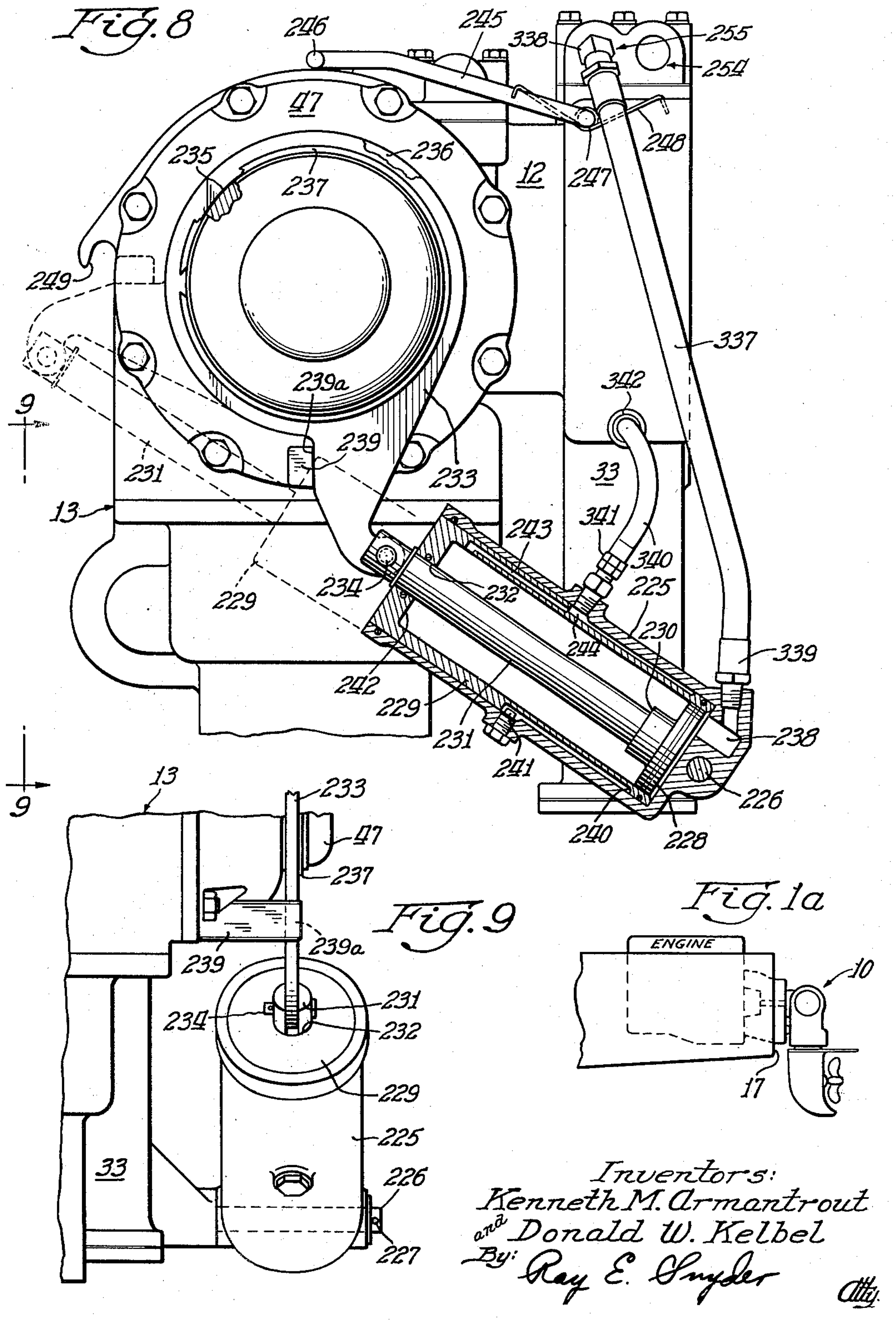
FIG. 8 is a partially sectioned vertical view of the drive unit showing the lift apparatus for pivoting the second and third casings about the first casing to position the second and third casings.
FIG. 9 is a partial view of the drive unit taken along line 9—9 of FIG. 8 showing the lift apparatus.

A latch 245 is provided for positively locking the intermediate casing 13 in the uppermost position (FIG. 8). The latch 245 includes a hook 246 which is pivotally mounted in an opening 247 in the head casing 12 and which is biased counterclockwise (FIG. 8) against the periphery of the head casing 12 by a spring 248. A hook 249 is formed on the intermediate casing 13 and is adapted to engage the latch hook 246 for positively restraining the intermediate casing 13 from rotating counterclockwise (FIG. 8). The latch 245 provides a means for positively holding the intermediate and propeller casings 13 and 14 in a horizontal or up position to facilitate maintenance and transportation of the drive unit. The latch 245 can be released by first pivoting the intermediate casing 13 clockwise (FIG. 8) to remove the latch hook 246 from the hook 249 on the intermediate casing 13 and then by manually rotating the latch 245 clockwise (FIG. 8) to remove the latch hook 246 from the hook 249 on the intermediate casing 13 out of the path of the hook 249 whereupon the intermediate casing 13 may be pivoted counterclockwise so that the hook 249 is beyond the latch hook 246.

A hydraulic system (FIG. 10) is provided for selectively operating the drive train shifting mechanism, the reverse lock mechanism, the intermediate and propeller casing lift and adjusting mechanism and for providing lubrication for the drive train. This system is illustrated schematically (FIG. 10) and broadly includes the pump 26 and the sump 33 (FIGS. 1 and 11), a shift valve block 250 (FIGS. 1 and 12) having a regulator valve 251 and a shift or selector valve 252 (FIGS. 1 and 10), a lift valve block 253 (FIG. 13) having a lift valve 254 and a bleed valve 255, and a lubricating system 256 (FIGS. 10, 11, 14, and 15).

Figure 10:
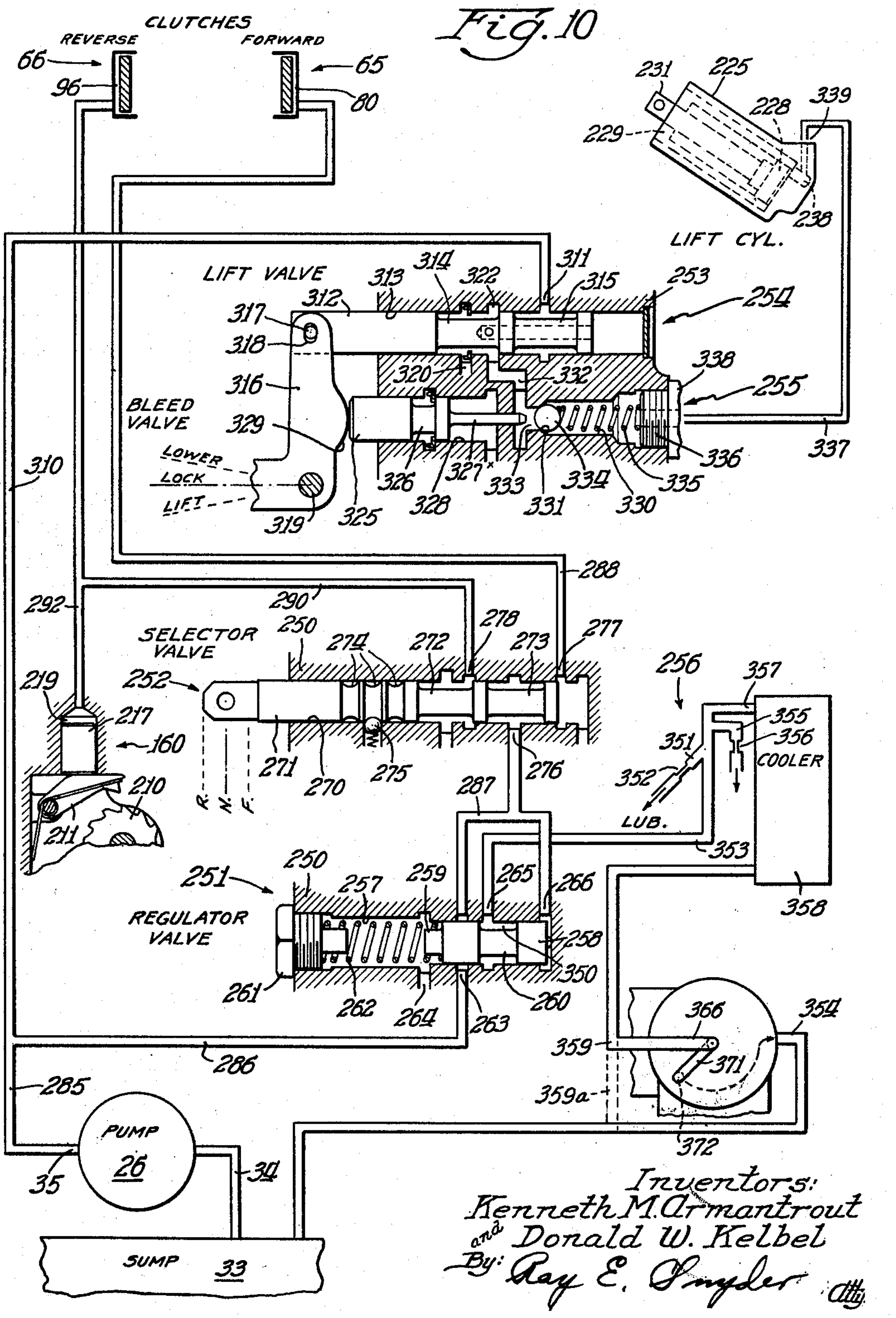
FIG. 10 is a schematic view of the hydraulic system utilized in operating the marine drive unit.

The regulator valve 251 is provided with a cylindrical bore 257, in which a regulator piston 258 is slidably mounted. A reduced diameter 259 and a relieved portion 260 are formed in the piston 258 and a spring retainer 261 is adapted to retain a compression spring 262 mounted on the relieved portion 259 for urging the piston 258 to the right (FIG. 10). The bore 257 is provided with an annular inlet port 263, an annular safety relief port 264, an annular bleed port 265 and an annular regulating port 266.

Figure 12:
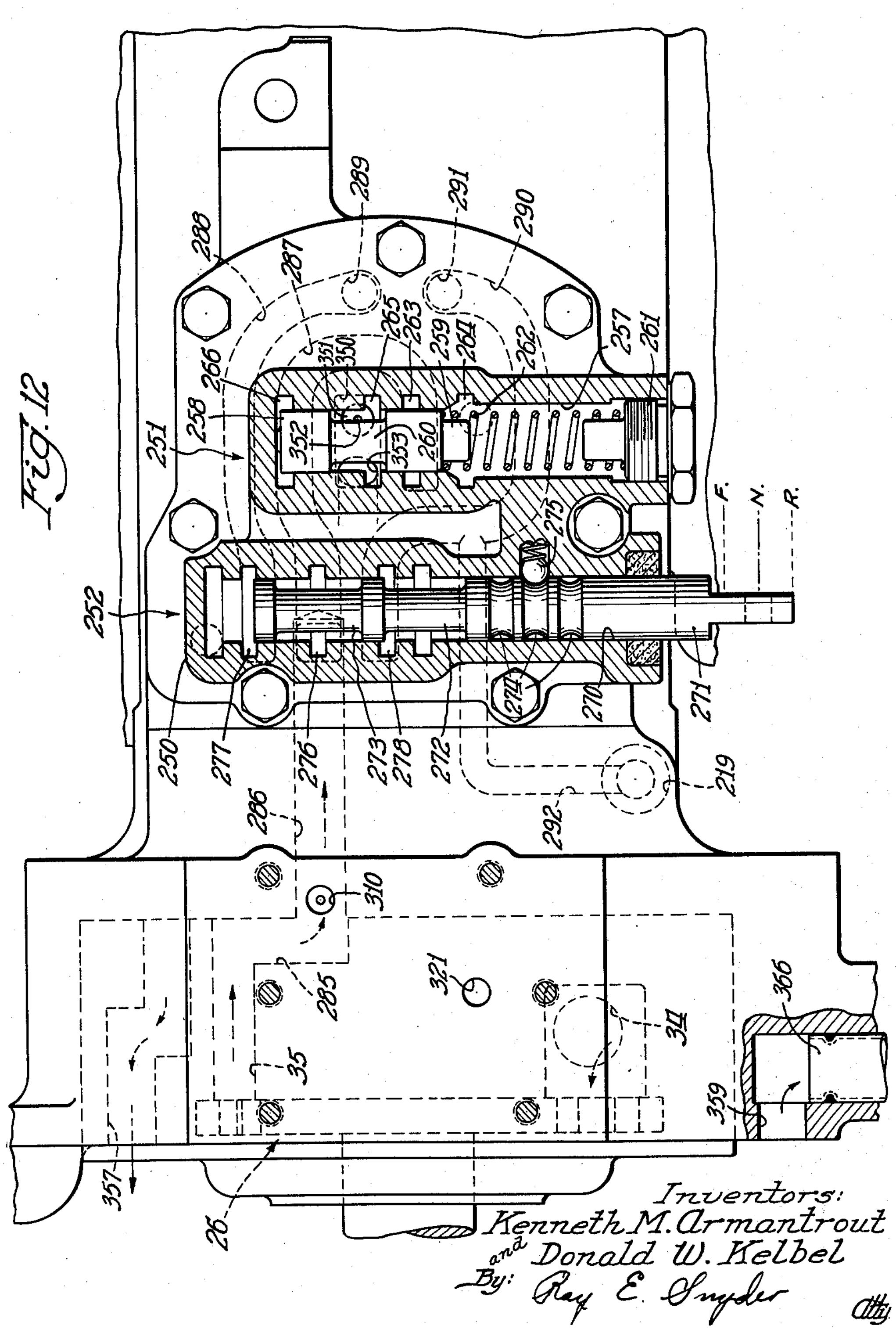
FIG. 12 is a sectional view taken along line 12—12 of FIG. 1 showing the valve configuration utilized for shifting the drive unit.

The selector valve 252 is provided with a cylindrical bore 270, in which a selector piston 271 is slidably mounted. Grooves or relieved portions 272 and 273 are provided on the piston 271 and three annular notches 274 are formed therein and adapted to receive a ball detent 275 and thereby provide three piston restraining positions; namely, forward (F), neutral (N) and reverse (R) (FIGS. 10 and 12). The bore 270 is provided with an annular inlet port 276, an annular forward outlet port 277, and an annular reverse outlet port 278.

A system of passages or conduits is provided for interconnecting the pump 26 with the regulator valve 251, the selector valve 252, the forward and reverse clutches 65 and 66 respectively and the reverse lock mechanism 160.

Figure 11:
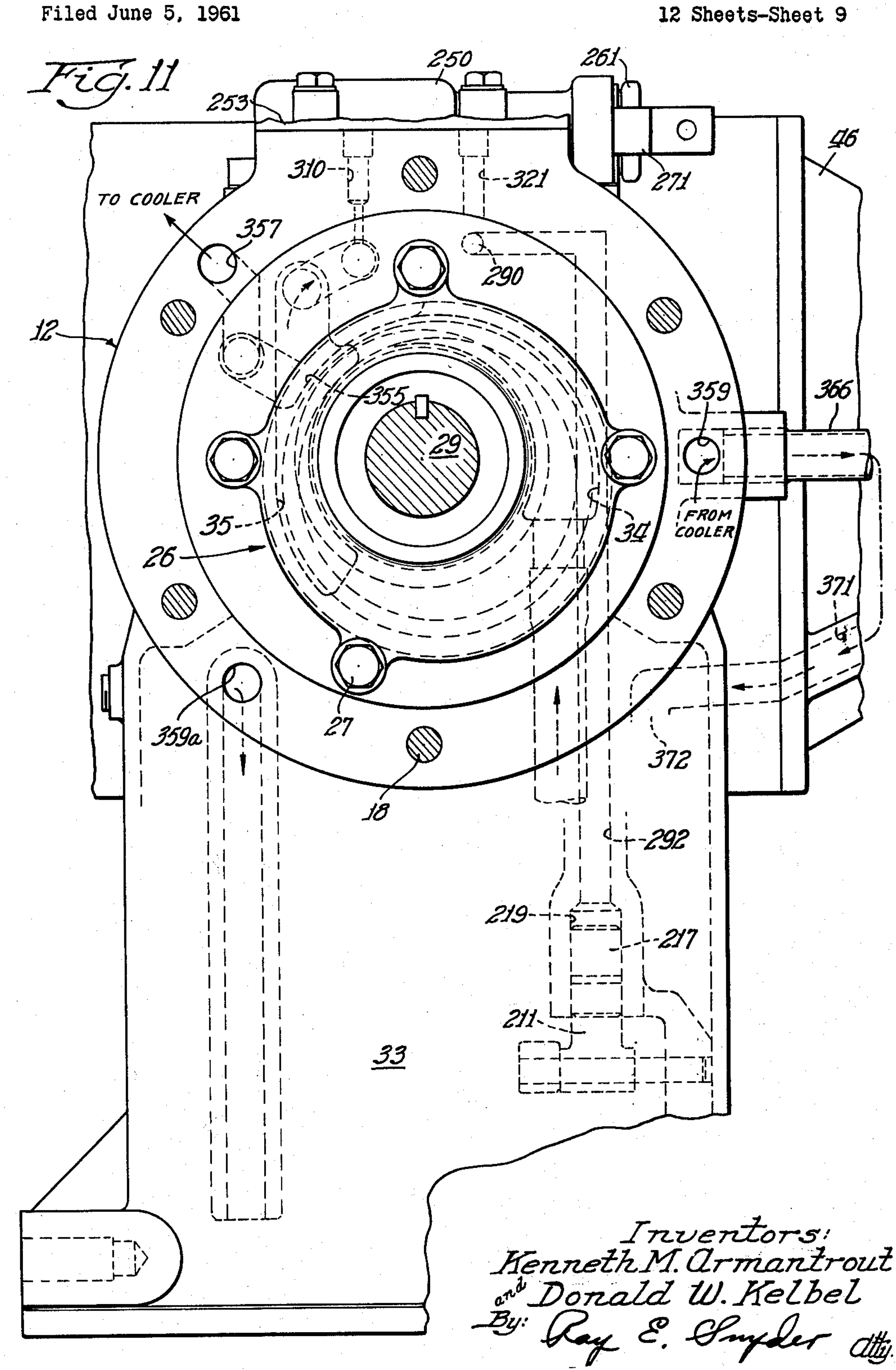
FIG. 11 is a sectional view taken along line 11—11 of FIG. 1 showing the interrelationship of the hydraulic system including the cooled lubricating system and the reverse lock mechanism.

The pump discharge passage 35 is connected with the inlet port 263 of the regulator valve 251 by interconnecting conduits 285 and 286. A common conduit 287 interconnects the regulator valve inlet port 263, selector valve inlet port 276 and the regulator valve regulator port 266. A forward clutch conduit 288 (FIG. 10) is provided, which interconnects the forward outlet port 277 of the manual selector valve 252 and a vertical forward clutch (F.C.) passage 289 in the head casing 12 (FIGS. 2 and 12). A reverse clutch conduit 290 is provided which interconnects the reverse outlet port 278 of the manual selector valve 252 and a vertical reverse clutch (R.C.) passage 291 in the head casing 12 (FIGS. 2 and 12). The reverse clutch conduit 290 is also connected to the cylinder 219 of the reverse lock mechanism 160 by a reverse lock conduit 292 (FIGS. 10, 11 and 12).

The hydraulic system is extended for transmitting fluid from the forward and reverse clutch vertical passages 289 and 291 to the forward and reverse clutch chambers 80 and 96 of the forward and reverse clutches 65 and 66 respectively (FIGS. 2 and 10). For this purpose a pair of tubes or conduits 293 and 294 are provided in the head casing 12 (FIG. 2) which open into the vertical forward and vertical reverse clutch passages 289 and 291 respectively. The tubes 293 and 294 are secured to an annular sleeve 295 which is rotatably supported by the idler shaft 56. The sleeve 295 is anchored against axial movement on the idler shaft 56 by means of a pin 296 which interlocks the sleeve 295 and the fulcrum tube 40 (FIGS. 1 and 2).

A pair of radial passages 297 and 298 (FIG. 2) are provided in the idler shaft 56 and are in registry with the tubes 293 and 294 respectively. An axial passage 299 and a radial passage 300, and a hub passage 297 are provided in the idler shaft 56 and the hub 67 respectively for interconnecting the passage 297 of the idler shaft 56 with the chamber 80 of the forward clutch 65. Similarly, an axial passage 302 and a radial passage 303, and a hub passage 304 are provided in the idler shaft 56 and the hub 85 respectively for interconnecting the radial passage 298 with the chamber 96 of the reverse clutch 66. Thus, a fluid path is established from the forward clutch vertical passage 289 to the forward clutch chamber 80 and similarly a fluid path is established from the reverse clutch vertical passage 291 to the reverse clutch chamber 96.

In operation, the forward and reverse drive clutches 65 and 66 respectively are actuated by fluid supplied by the pump 26 (FIG. 10). The pump is driven by the drive shaft 29 (FIG. 1) and draws fluid from the sump 33 through the tube 34 and discharges the fluid into the discharge chamber 35. The fluid passes into conduits 285, 286 and enters the regulator valve through the regulator inlet port 263. The regulator inlet port 263 is connected with the conduit 287 and thus the fluid is admitted to the regulator port 266 of the regulator valve. The fluid in port 266 urges the piston 258 to the left against the tension of the spring 262 (FIG. 10). The piston 258 will move to the left until the inlet port 263 is exposed to the relieved portion 260 of the piston 258. The groove 265 will thereupon interconnect the inlet port 263 and the bleed port 265 so as to tend to lower the pressure in the conduit 286 and 287 by relieving fluid through the bleed port 265. Thus, it can be seen that the combination of a force exerted by the fluid in the port 266 and the counteracting force of the spring 262 will position the piston 258 so as to regulate the pressure in the conduit 287.

The regulator fluid in the conduit 287 enters the selector valve through the inlet port 276. The selector valve 252 is shown in the neutral (N) position (FIGS. 10 and 12) and as a consequence thereof the groove 273 of the selector valve piston 271 is centered on the inlet port 276 and the fluid admitted thereto is not permitted to enter the conduit 288 or 290. Thus, no actuation of either the reverse or forward drive clutches 66 or 65 can be accomplished and the unit will remain in neutral.

A forward drive train is provided when the selector valve piston 271 is moved to the forward (F) position. In this position the groove 273 of the piston 271 will be moved to the right (FIG. 10) so as to interconnect the forward outlet port 277 and the inlet port 276. Fluid will thereby be admitted to the conduits and passages 288, 289, 293, 297, 300 and 301 which will provide fluid in the chamber 80 to actuate the forward drive clutch 65. The actuation of the forward drive clutch 65 will provide a forward drive train from the forward drive bevel gear 54 to the bevel gear 113 and thus provide a forward drive to the propeller shaft 146 as previously described.

Similarly, a reverse drive train is provided when the piston 271 of the selector valve 252 is moved to the reverse (R) position (FIGS. 10 and 12). The groove 273 of the piston 271 will interconnect the reverse outlet port 278 with the inlet port 276 and fluid will pass through the selector valve 252 into conduits and passages 290, 291, 294, 298, 302, 303 and 304 (FIGS. 2, 10, and 12). Thus fluid will be provided in the chamber 96 of the reverse drive clutch 66 whereupon the clutch 66 will be actuated to provide the reverse drive between the reverse drive gear 52 and the bevel gear 113 which in turn will provide a reverse drive to the propeller shaft 146 as previously described.

The reverse lock mechanism 160 will be actuated when the selector valve is in the reverse (R) position inasmuch as the conduit 292 is connected to the conduit 290 (FIG. 10). The fluid thereby provided in the conduit 292 will enter the chamber 219 above the piston 217 and urge the piston 217 downward so as to force the pawl 211 into engagement with the ratchet 210 and prevent counterclockwise rotation of the ratchet 210 and reel 171 (FIG. 3). The cable 177 will thus be prevented from unrolling on the reel 171 and the intermediate casing 13 will be prevented from rotating counterclockwise about the head casing 12. Thus, when the selector valve 252 is in the reverse position the reverse lock 160 will be actuated so as to prevent the reverse thrust of the propeller on the shaft 146 from raising the intermediate casing 13 about the head casing 12 which would otherwise remove the propeller from the water and frustrate the reverse drive thereof.

The hydraulic system (FIG. 10) is provided with a supplemental system for actuating the pistons 228 and 229 of the lifte mechanism. The supplemental system originates with the conduit 310 which is connected to the conduit 310 supplies fluid to an inlet port 311. A piston 312 is slidably mounted in a bore 313 and is provided with two relieved portions 314 and 315. The piston 312 is loosely connected to a lever 316 by a pin 317 extending laterally from the piston 312 into a slot 318 in the lever 316. The lever is pivotally mounted on a shaft 319 which extends from the valve block 253. It should be noted that by manually oscillating the lever 316 on the shaft 319 it will cause the reciprocating of the piston 312 in the passage 313. The passage 313 is provided with an exhaust port 320 opening into a sump return conduit 321 (FIG. 13) and an intermediate port 322.

The bleed valve 255 includes a piston 325 having two relieved portions 326 and 327 and is slidably mounted in a bore 328. The outer end of the piston 325 is positioned adjacent a cam surface 329 on the lever 316. The bleed valve 255 also includes an outlet passage 330 which has an annular shoulder or seat 331. A passage 332 is provided which interconnects the outlet passage 330 with an inlet port 333. A ball check valve 334 is urged against the shoulder or seat 331 by virtue of a spring 335 which is held in the outlet passage 330 by a retainer 336.

A flexible conduit 337 (FIGS. 8 and 10) has one connected to outlet passages 330 by a coupling 338 and the other end thereof connected to the inlet chamber 238 of the lift cylinder 225 by a coupling 339 (FIG. 8). A flexible exhaust conduit 340 has one end thereof connected to the center of the cylinder 225, by a coupling 341 and has other end thereof connected to the sump 33 by a coupling 342. The exhaust conduit 340 allows any fluid or air which may be in the upper part of cylinder 225, to flow back into the sump 33 when the pistons 228 and 229 are extended by the force of the fluid in the lower part of the cylinder 225 (FIG. 8). A washer 343 is positioned in an annular recess 344 and extends into the relieved portion 326 of the piston 325 for the purpose of limiting the axial movement of the piston 325.

It should be noted that clockwise rotation of the lever 316 on the shaft 319 (FIGS. 10 and 13) will cause the piston 325 to move towards the ball check valve 334 and eventually urge the ball check valve 334 from its seat on the shoulder 331. Also, it should be noted that any fluid pressure exerted in the bleed valve inlet port 333 will act on the end of the piston adjacent the ball check valve 334 so as to urge the piston 325 into following engagement with the cam surface 329 of the lever 316.

In operation, when the intermediate and propeller casings 13 and 14 are to be adjustably lifted or otherwise pivoted about the head casing 12, the lever 316 is rotated counterclockwise (FIGS. 10 and 13) to the lift position (LIFT). When the lever 316 is in the "LIFT" position, piston 312 will be moved to its left or lowermost position (FIGS. 10 or 13) so that the relieved portion 315 will interconnect the inlet port 311 and the intermediate port 322. Fluid will thereby pass from the intermediate port 322 through the passage 332 into the bleed valve inlet port 333 and force the ball check valve 334 off of the shoulder or seat 331 against the force of the spring 335. The fluid thereupon will pass into outlet passage 330, into the flexible conduit 337 and into the chember 238 of the cylinder 225. Fluid will continue to flow into the cylinder 225 as long as the lever 316 is in the "LIFT" position or until the pistons 228 and 229 are completely extended (FIG. 8), depending on the position desired.

In operation it may be desired that only a partial extension of the pistons 228 and 229 occur so as to position the intermediate and propeller casings 13 and 14 in some intermediate position between vertical and horizontal (FIG. 8). In this event, the lever 316 is moved to the lock (LOCK) position (FIGS. 10 and 13) when the desired extension of pistons 228 and 229 is reached. When the lever 316 is moved to the "LOCK" position, the piston will return to the position illustrated (FIGS. 10 and 13) whereupon the relieved portion 315 will no longer interconnect the lift valve inlet port 311 and the intermediate port 322. Further supply of fluid to the cylinder 225 will thus be prevented and the fluid under pressure in the cylinder will tend to exhaust itself through the bleed passage 330 into the inlet port 333 whereupon the ball check valve 334 will be urged into engagement with the shoulder or seat 331 and as a consequence will prevent fluid from escaping. The pistons 228 and 229 will thereupon be retained in the selected position with the intermediate and propeller casings 13 and 14 in a corresponding selected position.

Figure 13:
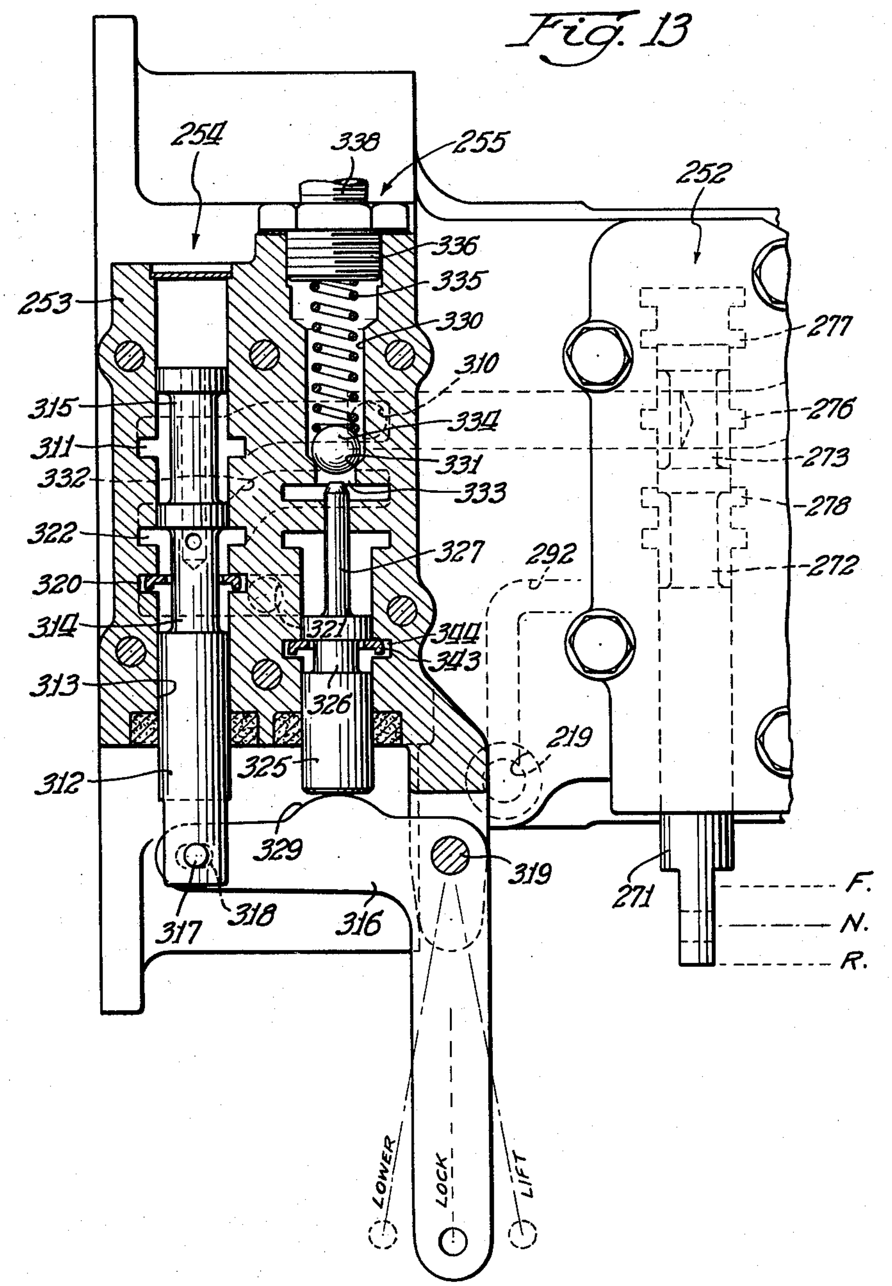
FIG. 13 is a sectional view taken along line 13—13 of FIG. 1 showing the valve and regulator configuration utilized for operating the lift mechanism.

In operation, the intermediate and propeller casings 13 and 14 may be rotated counterclockwise about the head casing (FIG. 8) to lower the intermediate and propeller casings. To accomplish this, the lever 316 is rotated to the "LOWER" position (FIGS. 10 and 13) whereupon the piston 312 will be moved from its neutral position, as illustrated, to the right or up (FIGS. 10 or 13). Under these circumstances, the relieved portion 314 will maintain an interconnection between the intermediate port 322 and the exhaust port 320 and the cam surface 329 will force the piston 325 toward the ball check valve 334 and unseat the ball check valve from the shoulder or seat 331. The fluid under pressure contained in the cylinder 225 will thereupon pass back through the flexible conduit 337, past the ball check valve 334 into inlet port 333, through the conduit 332 into the intermediate port 322, through the relieve portion 314 of the piston 312 and exhaust through the exhaust port 320, and into the sump 33 through the sump return passage 321.

A lubricating system is provided by the hydraulic system (FIG. 10) and includes a system of passages and conduits which are fed from the bleed port 265 of the regulator valve 251. The bleed port 265 opens into a chamber or conduit 350 (FIG. 1) which divides into a lubricating conduit 351 restricted by the orifice 352, and into a lubricating passage 353 (FIGS. 1, 10 and 12) which is unrestricted. The orifice 352 allows only a small amount of fluid to pass therethrough onto the driving bevel gear 30 for lubricating the forward and reverse drive bevel gears 54 and 52 and the drive bevel gear 30.

Figure 14:
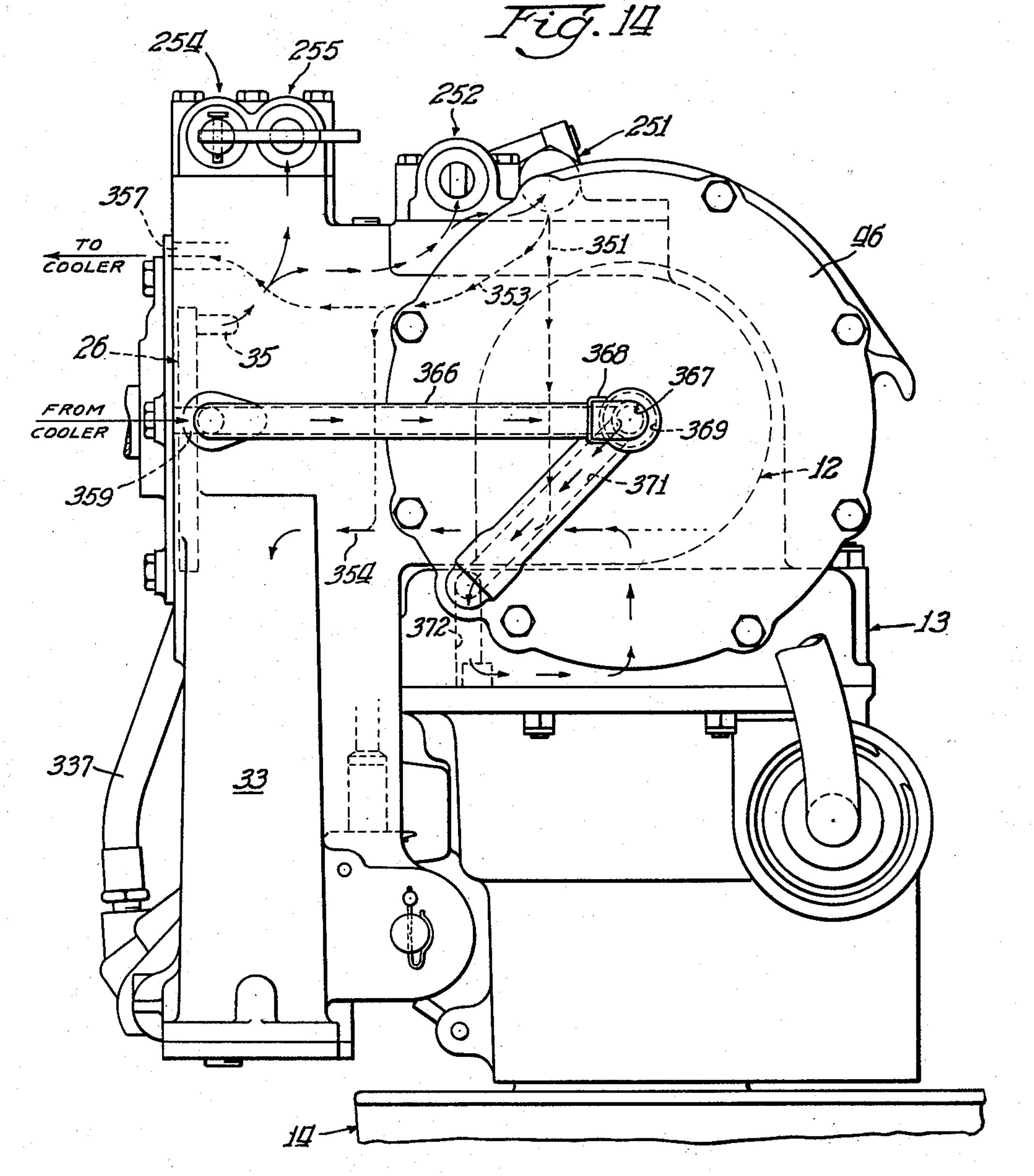
FIG. 14 is a side view of the marine drive unit showing the general path of the fluid used for shifting the transmission for lifting the second and third casings, and for directly lowering the temperature of the fluid used for lubricating the drive train.

The lubricating fluid thus supplied through the orifice 352 will fill the intermediate casing 13, above the seal 150 and the gear 113, and will overflow to the left (FIG. 1) through passages 354 in the bottom of the bearing retainer 25 and into the sump 33, as indicated by the arrows (FIGS. 1 and 14).

The lubricant in the unrestricted passage 353 flows into an upper chamber 355 in the bearing retainer 25. A small part of the lubricant in the chamber 355 is metered through an orifice 356 in the bearing retainer 25 for the purpose of lubricating the bearings 28. The greater remaining quantity of lubricating fluid in the chamber 355 passes through a passage 357 (FIGS. 11, 12 and 15) into a cooler 358 (FIG. 10). It should be noted that a greater portion of the lubricating fluid is caused to flow into the cooler than is allowed to flow onto driving bevel gear 30 and bearings 28 by virtue of the restricted passages 352 and 356 respectively, thereby providing cooling for the greater portion of the lubricating fluid. The fluid is returned from the cooler 358 by way of a passage or conduit 359 (FIGS. 1, 3, 10, and 14).

The path of the lubricating fluid is illustrated by the arrows (FIG. 14). Generally, it should be noted that the lubricant flows from the pump discharge chamber 35 to the bleed valve 255 and to the regulator and selector valves 251 and 252 respectively. The small amount of fluid utilized for lubricating gears 30, 52, and 54 passes from the regulator valve 251 downwardly onto the driving bevel gear 30, into the casing 13 and overflows back into the sump 33. The larger amount of fluid passes to the left (FIG. 2) whereupon part thereof is utilized to lubricate the bearings 28 as previously described. However, the greater quantity thereof passes through the passage 357 to the cooler 358 and is returned from the cooler through the conduit or passage 359.

An external conduit 366 has one end connected to the conduit 359 (FIGS. 10 and 11) and the other end rotatably positioned in a cylindrical passage 367 in the cover plate 46 (FIGS. 2 and 14). The conduit 366 is held in position in the passage 367 by a retaining spring 368 which is anchored in an annular recess 369 in the cover plate 46 and a seal 370 is provided in a recess 366*a* in the conduit 366.

A conduit 371 (FIG. 2) is provided in the cover plate 46 and is adapted to carry the lubricant into a passage 372 (FIG. 14) in the intermediate casing 13, which in turn opens into the intermediate casing and head casings 12 and 13 adjacent the bevel gear 113. The cooled lubricant thus supplied to the casing 13 through passage 372 is combined with the lubricant supplied to the casing 13 through conduit 351 (FIGS. 10 and 14). The overall temperature of the lubricant utilized in the casing 13 is thereby lowered and the combined cooled lubricant overflows through passage 354 and returns to the sump 33 for recirculation.

A modified embodiment of applicants' lubricating system (FIGS. 10 and 13) is provided for drive units which are to be used under circumstances of light loading. If there is little or no chance of extended heavy load application which would unduly raise the temperature of the lubricant in the casing 13 it is not necessary to provide the cooled lubricant directly to the lubricant in the casing 13 to lower the temperature thereof. Instead, the modified form of applicants' lubricating system uses the conduit 359*a* (FIGS. 10 and 15) to return the lubricant from the cooler directly into the sump 33. This modified form does not utilize the conduits 366, 371 and the associated elements thereof (FIGS. 2 and 14) to supply cooling lubricant to the lubricant in casing 13.

It should be noted that the modified lubricating system is practically identical to the lubricating system previously described. The only exception being that the fluid lubricant returning from the cooler passes directly into the sump through the alternative path 359*a* (FIGS. 10 and 15) and is not passed through conduits 366 and 361, and combined with the lubricant in casing 13 to cool the lubricant retained there.

I wish it to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through a rear portion of the boat, the connection between said first and second casings being a pivotal connection through a horizontal axis lateral to the longitudinal axis defined by said first casing; said drive train including a drive shaft mounted in said first casing and adapted to be driven by the engine, a propeller shaft in said third casing for driving the propeller, and hydraulically actuatable forward and reverse drive means for completing forward and reverse drive connections between said drive shaft and said propeller shaft for driving the boat in forward and reverse directions; said forward and reverse drive means including an idler shaft, forward and reverse bevel gears rotatably mounted on said idler shaft and in constant mesh with a drive bevel gear mounted on said drive shaft, hydraulically actuatable clutches for selectively clutching the forward or reverse bevel gears to the idler shaft and means for drivingly connecting the idler shaft to the propeller shaft.

2. A marine outboard drive unit for a boat having an inboard engine and an outboard propeller comprising the combination of a series of three interconnected casings, the first of said casings defining a longitudinal axis and being mounted on the engine and extending through a rear portion of the boat, a second of said casings being pivotally connected to said first casing for pivotal movement about a horizontal axis lateral to the longitudinal axis through said first casing, said second and third of said casings being rotatably interconnected, a drive shaft rotatably mounted in said first casing adapted at one end to be driven by the engine and having a drive shaft bevel gear formed on the other end, an idler shaft rotatably mounted in said first casing coaxial with said pivotal connection between said first and second casings, reverse and forward drive bevel gears rotatably mounted on said idler shaft in opposed relationship and adapted to be driven in opposite directions by said drive shaft bevel gear, hydraulically actuatable clutch means for selectively connecting said forward and reverse drive bevel gears to said idler shaft, means for actuating said clutch means, an idler shaft drive bevel gear rotatably fixed to said idler shaft, an intermediate shaft rotatably mounted in said second and third casings, a driven intermediate shaft bevel gear rotatably fixed to said intermediate shaft and adapted to drivingly engage said idler shaft drive bevel gear, a propeller shaft rotatably mounted in said third casing adapted for driving a propeller, and interconnecting bevel gears drivingly interconnecting said intermediate shaft and said propeller shaft.

3. A marine outboard drive unit for a boat having an inboard engine and an outboard propeller comprising the combination of a series of three interconnected casings, the first of said casings defining a longitudinal axis and being supported by the boat, the second of said casings being pivotally connected to said first casing for pivotal movement about an axis through said first casing, the second and third of said casings being rotatably interconnected, a drive shaft rotatably mounted in said first casing adapted at one end to be driven by the engine and having a drive shaft bevel gear formed on the other end, an idler shaft rotatably mounted in said first casing coaxial with the pivotal connection between said first and second casing, reverse and forward drive bevel gears rotatably mounted on said idler shaft in opposed relationship and adapted to be driven in opposite directions by said drive shaft bevel gear, hydraulically actuatable clutch means for connecting said forward drive bevel gear to said idler shaft, hydraulically actuatable clutch means for connecting said reverse drive bevel gear to said idler shaft, means for independently actuating either of said clutch means to complete a forward or reverse drive to said idler shaft, a bevel gear rotatably fixed to said intermediate shaft and adapted to drivingly engage said idler shaft bevel gear, a propeller shaft rotatably mounted in said third casing and adapted to drive a propeller, and bevel gears drivingly interconnecting said intermediate shaft and said propeller shaft.

4. A marine outboard drive unit for a boat having an inboard engine and an outboard propeller and comprising the combination of a series of three interconnected casings, the first of said casings being mounted on the engine, the second of said casings being pivotally connected to said first casing for pivotal movement about an axis through said first casing, the second and third of said casings being rotatably interconnected, a drive shaft rotatably mounted in said first casing adapted at one end to be driven by the engine and having a bevel gear formed on the other end, an idler shaft rotatably mounted in said first casing coaxial with the pivotal connection between said first and second casing, reverse and forward drive bevel gears rotatably mounted on said idler shaft in opposed relationship and adapted to be driven in opposite directions by said drive shaft bevel gear, a hydraulically actuatable clutch for connecting said forward drive bevel gear with said idler shaft, a hydraulically actuatable clutch for connecting said reverse drive bevel gear with said idler shaft, means for supplying hydraulic fluid within said first casing, a collar supported on said idler shaft, a reverse and a forward conduit for transmitting fluid from said supply to said collar, a reverse and a forward passage in said idler shaft in respective registry with said reverse and forward conduits in said collar for transmitting fluid from said collar to said reverse and forward clutches respectively, a valve for selectively connecting either of said conduits with said fluid supply means, an idler shaft bevel gear rotatably fixed to said idler shaft, an intermediate shaft rotatably mounted in said second and third casing, a bevel gear rotatably fixed to said intermediate shaft and adapted to drivingly engage said idler shaft bevel gear, a propeller shaft rotatably mounted in said third casing and adapted to drive a propeller, and bevel gears drivingly interconnecting said intermediate shaft and said propeller shaft.

5. A marine outboard drive unit for a boat having an inboard engine and an outboard propeller comprising the combination of a series of three interconnected casings containing a continuous drive train connecting the engine to the propeller, the first of said casings defining a longitudinal axis and being supported by the boat and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a pair of brackets extending from said first casing, one of said brackets having a reduced cylindrical portion extending between the brackets, a reel shaft supported by said brackets, a hollow cylindrical reel rotatably mounted on said shaft and said bracket reduced portion, a cable connected to the outer cylindrical surface of said reel and to said second casing, said reel being adapted for receiving said cable on its outer cylindrical surface when said reel is rotated to urge said second casing toward the down position, and a coil spring positioned on said reel shaft within said reel having one end thereof secured to said reduced bracket portion and the other end secured to said reel for resisting rotation of said reel when said cable is unwrapped from said reel to urge said second casing toward the down portion.

6. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the boat and extending through the transom of the boat, the second of said casings being pivotally connected to said first casing, for pivotal movement about a horizontal axis lateral to the axis through said first casing between a substantially horizontal up position and a substantially vertical down position, said gear train including a drive shaft in said first casing adapted to be driven by the engine and a propeller shaft in said third casing adapted to drive a propeller, a reel rotatably mounted on said first casing, and a spiral flat spring having an inner end rotatably mounted on said reel and an outer end pivotally connected to said second casing, said spiral spring being pre-shaped for providing a recoil bias between said first and second casings to urge said second casing toward the down position.

7. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing, for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a reel rotatably mounted on said first casing, and a spiral flat spring mounted on said reel having an inner end connected to said reel and an outer end connected to said second casing, said spring being pre-shaped in the spiral coiled condition for urging said reel to rotate to receive said spring in wrapped condition thereon to urge said second casing toward the down position.

8. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing, for pivotal movement about horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a reel rotatably mounted on said first casing, a spiral flat spring wrapped on said reel and having an inner end pivotally mounted on said reel and an outer end pivotally connected to said second casing, said reel being adapted to be rotated by said spiral spring to receive said spiral spring, said spiral spring being pre-shaped in the spiral wrapped condition for providing a re-coil bias between said first and second casings to urge said second casing toward the down position, and a coil spring positioned on the axis of said reel and having one end connected to said first casing and the other end connected to said reel for supplementing the force exerted by said spiral spring.

9. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a reel rotatably mounted on said first casing, a cable connected to the periphery of said reel and to said second casing, said reel being adapted to receive said cable when said reel is rotated to urge said second casing toward the down position, a peripheral rachet coaxially rigidly mounted on said reel, and a pawl pivotally mounted on said first casing and adapted to engage said rachet for preventing rotation of said reel to prevent pivotal movement of said second casing toward the up position.

10. A marine outboard drive unit for a boat having an inboard engine and an outboard propeller comprising the combination of a series of three interconnected casings containing a continuous drive train connecting the engine to the propeller, the first of said casings defining a horizontal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a reel rotatably mounted on said first casing, a cable connected to the periphery of said reel and to said second casing, said reel being adapted to receive said cable when said reel is rotated to urge said second casing toward the down position, a peripheral rachet coaxially mounted on said reel, a pawl pivotally mounted on said first casing and adapted to engage said rachet for preventing rotation of said reel and pivotal movement of said second casing toward the up position, and spring means for urging said reel to rotate.

11. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a reel rotatably mounted on said first casing, a cable connected to the periphery of said reel and to said second casing, said reel being adapted to receive said cable when said reel is rotated to urge said second casing toward the down position, spring means for urging said reel to rotate, a peripheral rachet coaxially mounted on said reel, and a pawl pivotally mounted on said first casing normally biased out of engagement with said rachet and actuatable to engage said rachet for preventing said second and third casings from rotating to the up position.

12. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a selectively operable means for pivoting said second casing about said first casing toward the up position, a hook extending from said second casing, a latch pivotally mounted on said first casing, and said latch being spring biased into engagement with said second casing and adapted to engage said hook for retaining said second casing in up position.

13. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the boat and extending through the transom of the boat, the second of said casings being pivotally connected to said first casing for pivotal movement about a horizontal axis lateral to the axis through said first casing between a substantial horizontal up position and a substantially vertical down position, said drive train including a drive shaft in said first casing adapted to be driven by the engine and a propeller shaft in said third casing adapted to drive a propeller, a reel rotatably mounted on said first casing, selectively operable means for pivoting said second casing about said first casing toward the up position, and a spiral spring mounted on said reel having an inner end connected to said reel and an outer end connected to said second casing, said reel being adapted for receiving said spiral spring when said reel is rotated to urge said second casing toward the down position, said spring being pre-shaped in the coiled condition for urging said reel to rotate to receive said spiral spring.

14. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the boat and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, selectively operable means for pivoting said second casing about said first casing toward the up position, a spiral spring having an inner end pivotally connected to said reel and an outer end pivotally connected to said second casing, said spiral spring being pre-shaped for providing a re-coil bias between said first and second casings to urge said second casings toward the down position, said reel being adapted to rotate to receive said spiral spring, and a coil spring positioned on the axis of said reel having one end connected to said first casing and the other end connected to said reel for urging said reel to rotate to receive said spiral spring for lowering said second casing.

15. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a fluid lubricant, a sump mounted upon said first casing for retaining said lubricant, a pump hydraulically interconnecting said sump and said first casing for pumping said lubricant from said sump into said first casing to lubricate said drive train portion in said first casing, and a drain in said first casing for returning said lubricant to said sump.

16. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a fluid lubricant, a sump mounted upon said first casing for retaining said lubricant, a pump hydraulically interconnecting said sump and said first casing for pumping said lubricant from said sump into said first casing to lubricate said drive train portion in said first casing, a lubricant seal between said second and third casings adapted to prevent lubricant from passing between said first and second casings, and a drain in said first casing for returning said lubricant to said sump.

17. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a fluid lubricant, a sump mounted upon said first casing for retaining said lubricant, a lubricant passage in said first casing enclosing said drive train portion in said first casing and opening into said sump, and a pump connected to said sump and said passage adapted for pumping said lubricant from said sump through said passage into said first casing.

18. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a fluid lubricant, a sump mounted upon said first casing for retaining said lubricant, a passage connected to said sump, a pump connected to said sump and said passage for pumping said lubricant from said sump through said passage to said first casing, means in said passage for cooling said lubricant, and lubricant conduit means connected to said pump for transmitting lubricant from said pump into said first casing to lubricate said drive train in said first casing.

19. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said gear train including a drive shaft in said first casing adapted to be driven by the engine and a propeller shaft in said third casing adapted to drive a propeller, a fluid lubricant, a sump mounted upon said first casing formed in said first casing for retaining said lubricant, a lubricant passage in said first casing, a pump interconnecting said sump and said passage for pumping said lubricant from said sump into said passage, a fluid cooler connected to said passage and adapted for receiving said lubricant to reduce the temperature thereof, and said cooler discharging said lubricant into said sump.

20. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, a fluid lubricant, a sump mounted upon said first casing for retaining said lubricant, a lubricant passage in said first casing, a pump interconnecting said sump and said passage for pumping said lubricant from said pump into said passage, a cooling means connected to said passage and adapted for receiving said lubricant to maintain the temperature of the lubricant below a predetermined level, said cooling means discharging said lubricant into said sump, conduit means connected to said passage and adapted for receiving lubricant from said passage and discharging said lubricant onto the portion of said drive train within said first casing to lubricate that portion of said gear train, and an overflow passage in said first casing providing an opening into said sump for allowing fluid to flow from said first casing into said sump to maintain a predetermined lubricant level in said first casing.

21. A marine outboard drive unit for a boat having an inboard engine and an outboard propeller comprising a first casing connected to the engine and extending through a rear portion of the boat, a drive shaft mounted in said first casing and adapted to be driven by the engine, a source of fluid pressure including a fluid pump driven by said drive shaft, a second casing pivotally connected to said first casing, an idler shaft mounted in said second casing and being perpendicular to said drive shaft, forward and reverse bevel gears rotatably mounted on said idler shaft on opposite sides of said drive shaft and being in constant mesh with a drive bevel gear mounted on said drive shaft, fluid pressure actuated forward and reverse clutches, means for selectively applying fluid pressure from said source to said clutches for connecting said forward and reverse bevel gears to said idler shaft to drive the idler shaft in forward and reverse directions, a third casing rotatably connected to said second casing, an intermediate shaft rotatably supported by said second and third casings, first and second intermediate bevel gears rotatably fixed to said intermediate shaft, said first intermediate bevel gear being in constant mesh with a bevel gear fixed to said idler shaft, a propeller shaft mounted in said third casing, a driven bevel gear rotatably fixed to said propeller shaft and being in constant mesh with said second intermediate bevel gear for driving the propeller in forward and reverse directions, and means for rotating said third casing relative to said second casing for steering the boat.

22. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, said drive train having selectively operable forward and reverse drives, means for selectively operating said forward and said reverse drives, a reel rotatably mounted on said first casing, a cable connected to the periphery of said reel and to said second casing, said reel being adapted for receiving said cable when said reel is rotated to urge said second casing toward the down position, spring means for urging said reel to rotate to receive said cable, a peripheral ratchet coaxially rigidly mounted on said reel, and a pawl pivotally mounted on said first casing and adapted to engage said rachet for preventing rotation of said reel to prevent pivotal movement of said second casing toward the up position.

23. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, said drive train having selectively operated forward and reverse drives, means for selectively operating said forward and reverse drives, a reel rotatably mounted on said first casing, a cable connected to the periphery of said reel and to said second casing, said reel being adapted for receiving said cable when said reel is rotated to urge said second casing toward the down position, spring means for urging said reel to rotate to receive said cable, a cylinder and cooperating piston means, said cylinder being pivotally connected to said first casing, said piston means being pivotally connected to said second casing, said cylinder and cooperating piston means being actuatable for pivoting said second casing upwardly about said first casing, hydraulic fluid pressure means for actuating said cylinder and cooperating piston means, a peripheral rachet coaxially rigidly mounted on said reel, and a pawl pivotally mounted on said first casing and adapted to engage said rachet for preventing rotation of said reel to prevent pivotal movement of said second casing toward the up position.

24. A marine outboard drive unit for a boat having an inboard engine and an outboard propeller comprising the combination of a series of three interconnected casings containing a continuous drive train connecting the engine to the propeller, the first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said gear train including a drive shaft in said first casing adapted to be driven by the engine and a propeller shaft in said third casing adapted to drive a propeller, said gear train having selectively operable forward and reverse drives, means for selectively operating said forward and said reverse drives, a reel rotatably mounted on said first casing, a cable connected to the periphery of said reel and to said second casing, said reel being adapted for receiving said cable when said reel is rotated to urge said second casing toward the down position, spring means for urging said reel to rotate to receive said cable, a peripheral rachet coaxially rigidly mounted on said reel, a pawl pivotally mounted on said first casing and adapted to engage said rachet for preventing rotation of said reel to prevent pivotal movement of said second casing toward the up position, a cylinder and cooperating piston means, said cylinder being pivotally connected to said first casing, said piston means being pivotally connected to said second casing, said cylinder and cooperating piston means being actuatable for pivoting said second casing upwardly about said first casing, a hydraulic fluid pressure means for actuating said cylinder and cooperating piston means, and a resilient member mounted on said first casing for determining the down position of said second casing.

25. A marine outboard drive unit for a boat having an inboard engine and an outboard propeller comprising the combination of a series of three interconnected casings containing a continuous drive train connecting the engine to the propeller, a first of said casings defining a longitudinal axis and being mounted on the engine and extending through the transom of the boat, the second of said casings being pivotally connected to said first casing for pivotal movement about a horizontal axis lateral to the axis through said first casing between a substantially horizontal up position and a substantially vertical down position, said drive train including a drive shaft in said first casing adapted to be driven by the engine and a propeller shaft in said third casing adapted to drive a propeller, said drive train having selectively operable forward and reverse drives, means for selectively operating said forward and said reverse drives, a reel rotatably mounted on said first casing, a cable connected to the periphery of said reel and to said second casing, said reel being adapted for receiving said cable when said reel is rotated to urge said second casing toward the down position, spring means for urging said reel to rotate to receive said cable, a peripheral rachet coaxially rigidly mounted on said reel, a pawl pivotally mounted on said first casing and adapted to engage said rachet for preventing rotation of said reel to prevent pivotal movement of said second casing toward the up position, a cylinder and cooperating piston means, said cylinder being pivotally connected to said first casing, said piston means being pivotally connected to said second casing, said cylinder and cooperating piston means being actuatable for pivoting said second casing upwardly about said first casing, a hydraulic fluid pressure means for actuating said cylinder and cooperating piston means, a resilient member mounted on said first casing for determining the down position of said second casing, a fluid lubricant, a sump for retaining said lubricant, a pump hydraulically interconnecting said sump and said first casing for pumping said lubricant from said sump into said first casing to lubricate said drive train portion in said first casing, and a drain in said first casing for returning said lubricant to said sump.

References Cited by the Examiner

UNITED STATES PATENTS

| | | | |
|---|---|---|---|
| 2,164,487 | 7/39 | Beckjord | 115—34 X |
| 2,311,069 | 2/43 | Miller | 184—104 |
| 2,483,521 | 10/49 | Blanchette | 192—87 |
| 2,486,049 | 10/49 | Miller | 115—34 |
| 2,532,470 | 12/50 | Wanzer | 115—35 |
| 2,582,896 | 1/52 | Acton | 254—93 |
| 2,700,359 | 1/55 | Dewhurst | 115—35 |
| 2,708,419 | 5/55 | Schmitter | 115—34 |
| 2,752,875 | 7/56 | Hills | 115—41 |
| 2,755,766 | 7/56 | Wanzer | 115—35 |
| 2,775,328 | 12/56 | Yokel | 192—57 |
| 2,905,133 | 9/59 | Clerk | 115—41 |
| 2,915,259 | 12/59 | Force | 242—107 |
| 2,988,039 | 6/61 | Nimmo | 115—35 |
| 3,006,311 | 10/61 | Hansson | 115—35 |
| 3,014,710 | 12/61 | Layne | 114—219 |
| 3,029,770 | 4/62 | Anderson | 115—41 |

FOREIGN PATENTS

| | | |
|---|---|---|
| 874,147 | 12/42 | France. |
| 1,182,572 | 1/59 | France. |

FERGUS S. MIDDLETON, *Primary Examiner.*

MILTON L. BUCHLER, *Examiner.*